(12) United States Patent
Xie

(10) Patent No.: US 12,553,456 B2
(45) Date of Patent: Feb. 17, 2026

(54) CLIP SYSTEM FOR WEARABLES

(71) Applicant: WAYZAR CORPORATION, San Jose, CA (US)

(72) Inventor: Aiguo Xie, San Jose, CA (US)

(73) Assignee: WAYZAR CORPORATION, San Jose, CA (US)

( * ) Notice: Subject to any disclaimer, the term of this patent is extended or adjusted under 35 U.S.C. 154(b) by 60 days.

(21) Appl. No.: 18/076,260

(22) Filed: Dec. 6, 2022

(65) Prior Publication Data

US 2023/0175539 A1    Jun. 8, 2023

Related U.S. Application Data

(60) Provisional application No. 63/286,158, filed on Dec. 6, 2021.

(51) Int. Cl.
*G02C 11/00*    (2006.01)
*F16B 2/06*    (2006.01)

(52) U.S. Cl.
CPC ............... *F16B 2/06* (2013.01); *G02C 11/10* (2013.01)

(58) Field of Classification Search
CPC .... F16B 2/06; F16B 2/24; F16B 2/245; F16B 2/248; F16B 2/22; G02C 11/10; G02C 11/00; G02C 11/02; G02C 11/04; G02C 5/14; G02C 5/22; A45F 5/004
See application file for complete search history.

(56) References Cited

U.S. PATENT DOCUMENTS

| | | | | |
|---|---|---|---|---|
| 171,681 | A * | 1/1876 | Meyer | A44C 1/00 24/13 |
| 1,262,005 | A * | 4/1918 | Bell | A45F 5/004 242/379.2 |
| 1,572,733 | A * | 2/1926 | Mccourt | G02C 5/143 351/123 |
| 1,827,243 | A * | 10/1931 | Kuehner | B23K 9/287 24/71 J |
| 2,388,554 | A * | 11/1945 | Kreisler | A44C 5/08 59/79.1 |
| 2,832,114 | A * | 4/1958 | Mead | G02C 11/00 D16/330 |

(Continued)

FOREIGN PATENT DOCUMENTS

CN    201307188 Y  *  9/2009

OTHER PUBLICATIONS

International Search Report and Written Opinion from PCT Application No. PCT/US2022/052037, dated Mar. 8, 2023, 8 pages.

(Continued)

*Primary Examiner* — Jason W San
*Assistant Examiner* — Anna S Rashid
(74) *Attorney, Agent, or Firm* — Kilpatrick Townsend & Stockton LLP

(57) ABSTRACT

A clip system is provided for wearable devices. In use, a clip mechanism of a wearable device includes a first arm configured to attach to a housing of the wearable device via a first hinge. Additionally, the clip mechanism includes a second arm configured to attach to the housing of the wearable device via a second hinge. Additionally, the clip mechanism includes a coupler to connect the first arm and the second arm, where the coupler comprises an elastic member which is configured to cause the coupler to change a distance from a side of the housing.

27 Claims, 55 Drawing Sheets

(56) References Cited

U.S. PATENT DOCUMENTS

| | | | | |
|---|---|---|---|---|
| 2,965,099 A * | 12/1960 | Aufricht | A61F 5/08 | 351/83 |
| 3,057,028 A * | 10/1962 | Lorber | B42F 1/10 | 24/67.9 |
| 3,301,083 A * | 1/1967 | Johnson | H01H 71/1018 | 74/471 R |
| 3,769,663 A * | 11/1973 | Perl | F21L 4/00 | 24/339 |
| 3,957,361 A * | 5/1976 | Buccicone | G02C 3/003 | 351/123 |
| 3,990,617 A * | 11/1976 | Carter | A45F 5/02 | 224/678 |
| 4,000,810 A * | 1/1977 | Leblanc | A45C 11/04 | 206/5 |
| 4,111,343 A * | 9/1978 | Selinko | A44B 99/00 | 24/3.11 |
| 4,170,052 A * | 10/1979 | Okerblom | B42F 1/08 | 24/67.9 |
| 4,732,465 A * | 3/1988 | Field | G02C 11/00 | 351/123 |
| 4,828,310 A * | 5/1989 | Schmidt, Jr. | A45F 5/004 | 294/154 |
| 4,903,379 A * | 2/1990 | Uchtman | A44C 3/001 | 24/351 |
| 4,968,128 A * | 11/1990 | Mendola | G02C 11/02 | 351/52 |
| 4,974,764 A * | 12/1990 | Cantwell | B25H 3/00 | 224/904 |
| 5,161,234 A * | 11/1992 | Nitta | G02C 11/02 | 351/52 |
| 5,323,516 A * | 6/1994 | Hartmann | A44C 5/2071 | 24/303 |
| 5,367,345 A * | 11/1994 | da Silva | G02C 11/10 | 351/158 |
| 5,727,290 A * | 3/1998 | Gilbert | G08B 3/1058 | 24/3.12 |
| 6,120,146 A * | 9/2000 | Harris | G02C 11/00 | 351/158 |
| 6,321,958 B1 * | 11/2001 | Erdmann | A45F 5/02 | 224/236 |
| 6,330,758 B1 * | 12/2001 | Feibelman | G02C 11/00 | 70/57.1 |
| 6,343,859 B1 * | 2/2002 | McCormick | G02C 11/00 | 351/111 |
| 6,363,582 B1 * | 4/2002 | Van Bladel | A44C 3/001 | 24/711.1 |
| 6,382,481 B1 * | 5/2002 | McIlmoil | A45F 5/004 | 224/245 |
| 6,971,147 B2 * | 12/2005 | Halstead | A45C 1/06 | 24/303 |
| 7,110,802 B1 * | 9/2006 | Kim | H04B 1/3888 | 455/90.3 |
| 7,401,388 B2 * | 7/2008 | Hansen | F16B 5/0614 | 24/297 |
| 7,578,007 B2 * | 8/2009 | McIntyre | A42B 1/0187 | 24/485 |
| 7,591,554 B2 * | 9/2009 | Guerrero | G02C 11/02 | 351/52 |
| 7,721,570 B2 * | 5/2010 | Lawrence | A63B 57/353 | 63/40 |
| D636,293 S * | 4/2011 | Dolce | D11/222 | |
| 7,980,435 B2 * | 7/2011 | Tages | A45F 5/00 | 224/269 |
| 8,051,541 B2 * | 11/2011 | Gupta | A44C 27/00 | 24/549 |
| D660,362 S * | 5/2012 | Clark | D20/22 | |
| 8,925,157 B2 * | 1/2015 | O'Daniel | B42F 1/08 | 24/DIG. 10 |
| 9,316,849 B2 * | 4/2016 | Wang | G02F 1/133528 | |
| D759,475 S * | 6/2016 | Banno | D8/395 | |
| 9,416,803 B1 * | 8/2016 | McGarity | B42F 1/006 | |
| 9,737,131 B1 * | 8/2017 | Oaks | G02C 3/00 | |
| 9,924,766 B2 * | 3/2018 | de Iuliis | A44C 5/12 | |
| 10,070,819 B2 * | 9/2018 | Gallagher | A61B 5/08 | |
| 10,132,340 B2 * | 11/2018 | Russell-Clarke | A44B 99/00 | |
| 10,185,163 B2 * | 1/2019 | Blum | H04N 23/50 | |
| 10,288,290 B2 * | 5/2019 | Laster | F01D 17/141 | |
| 10,492,593 B2 * | 12/2019 | Mainini | F16B 2/10 | |
| 10,914,329 B2 * | 2/2021 | Russell-Clarke | A43C 11/1493 | |
| 11,682,886 B1 * | 6/2023 | Finn, III | H02G 3/08 | 174/50 |
| 11,940,672 B2 * | 3/2024 | Gardill | G02C 11/00 | |
| 2002/0048488 A1 * | 4/2002 | Hotaling | A47D 15/00 | 403/410 |
| 2003/0127787 A1 * | 7/2003 | Konig | F16B 7/0493 | 267/179 |
| 2006/0055866 A1 * | 3/2006 | Dietz | G02C 11/00 | 351/41 |
| 2007/0006425 A1 * | 1/2007 | Woodbury | A45F 5/00 | 24/3.3 |
| 2007/0008484 A1 * | 1/2007 | Jannard | H04B 1/385 | 351/41 |
| 2008/0239232 A1 * | 10/2008 | Guerrero | G02C 11/02 | 351/52 |
| 2009/0218454 A1 * | 9/2009 | Stanley | F16M 13/00 | 248/306 |
| 2010/0107689 A1 * | 5/2010 | Dobashi | A44C 17/02 | 63/26 |
| 2011/0234973 A1 * | 9/2011 | Ye | G02C 11/10 | 351/158 |
| 2012/0081658 A1 * | 4/2012 | Sugihara | G02B 27/0176 | 351/158 |
| 2013/0181083 A1 * | 7/2013 | Salentine | A45F 5/02 | 242/399.2 |
| 2014/0047681 A1 * | 2/2014 | Walker | B65F 1/1484 | 29/525.01 |
| 2014/0160421 A1 * | 6/2014 | Kavana | G02C 11/00 | 351/43 |
| 2014/0252184 A1 * | 9/2014 | Stephens | F16B 2/248 | 248/205.1 |
| 2014/0253868 A1 * | 9/2014 | Jannard | G02B 27/017 | 351/158 |
| 2014/0320796 A1 * | 10/2014 | Brodkin | G02C 11/02 | 351/52 |
| 2014/0345090 A1 * | 11/2014 | Wang | G02F 1/133351 | 24/303 |
| 2015/0342273 A1 * | 12/2015 | English | A41D 17/005 | 36/1.5 |
| 2017/0120664 A1 * | 5/2017 | Klein | F16B 2/245 | |
| 2017/0181297 A1 * | 6/2017 | Filson | H05K 5/0226 | |
| 2018/0042369 A1 * | 2/2018 | Blum | A45F 5/02 | |
| 2018/0116384 A1 * | 5/2018 | Blum | G02C 11/00 | |
| 2018/0171651 A1 * | 6/2018 | Ubiñana Felix | E04G 17/04 | |
| 2020/0133020 A1 * | 4/2020 | Chang | G02C 11/00 | |
| 2020/0141432 A1 * | 5/2020 | Millward | B65H 75/20 | |
| 2020/0218091 A1 * | 7/2020 | John | G02C 11/10 | |
| 2021/0033882 A1 * | 2/2021 | McWilliams | F16B 11/006 | |
| 2022/0271706 A1 * | 8/2022 | Creasy | H02S 30/10 | |
| 2024/0369858 A1 * | 11/2024 | Viscariello | G02C 11/02 | |

OTHER PUBLICATIONS

Application No. EP22905047.1, Extended European Search Report, Mailed On Oct. 29, 2025, 11 pages.

* cited by examiner 1C-00

1E-00

3D-00

11-00

14C-00

20B-00

21-00

23-00

CLIP SYSTEM FOR WEARABLES

RELATED APPLICATIONS

The present application claims the benefit of and priority to U.S. Patent Provisional Application No. 63/286,158, filed 2021 Dec. 6, entitled "CLIP AND WEARABLE THEREOF," the contents of which are fully incorporated by reference for all purposes.

FIELD OF THE INVENTION

The present invention relates to clips, and more particularly relates to clips for wearables to be attached to objects of varying thickness or shape or to be detached therefrom.

BACKGROUND

Currently, modern portable electronic devices are hard to wear on a user's body. This is amplified as the size of the portable electronic devices becomes smaller (thereby requiring them to be worn more than held). However, attaching and/or detaching a portable electronic device to a user's body remains problematic. Some have sought to remedy this issue by integrating the portable electronic device onto a proprietary eyewear frame, as an example. However, requiring use of proprietary eyewear frames requires users to abandon their current eyeglasses, which is especially problematic for those that require prescriptive lens. As such, the ability to attach and/or detach a portable electronic device to a user's body is currently restricted, requires often permanent proprietary alternatives, and is not easily or quickly done.

As such, there is thus a need for addressing these and/or other issues associated with the prior art.

SUMMARY

A clip system is provided for wearable devices. In use, a clip mechanism of a wearable device includes a first arm configured to attach to a housing of the wearable device via a first hinge. Additionally, the clip mechanism includes a second arm configured to attach to the housing of the wearable device via a second hinge. Additionally, the clip mechanism includes a coupler to connect the first arm and the second arm, where the coupler comprises an elastic member which is configured to cause the coupler to change a distance from a side of the housing.

In one embodiment, each of the first arm and the second arm may include an attachment section at a first end, a linking section at a second end, and a lever section between the first end and the second end. Additionally, the first arm may be configured such that when the first arm rotates around the first hinge, the linking section increases the distance from the side of the housing. The second arm may be configured such that when the second arm rotates around the second hinge, the linking section increases the distance from the side of the housing.

In another embodiment, the first arm rotates around the first hinge and when the second arm rotates around the second hinge, a gap between the coupler and the housing may change. Additionally, the gap may be used to host an external object.

In another embodiment, when the first arm rotates around the first hinge and when the second arm rotates around the second hinge, the elastic member changes in tension. Additionally, the rotation of the first arm around the first hinge and the rotation of the second arm around the second hinge may occur in opposite rotation directions.

In another embodiment, the expansion of the expandable coupler creates a gap, and the gap may be used to host an external object, and the external wearable device may be held to the external object by a combination of at least one of: friction of the surface of the wearable device and of the surface of the external object, or the tension. Additionally, when the distance between the coupler and the housing of the wearable device changes, a gap may be created between the wearable device and the side of the housing, and an external object can be hosted within the gap such that the wearable device is affixed to the external object based on at least one of: friction of the surface of the external object, friction of the surface of the wearable device, a biasing force from the first arm and the second arm, or a tension of the elastic member.

In another embodiment, the coupler may comprise at least one of: a serpentine spring, a coil spring, or an elastic band. Additionally, the serpentine spring is configured to provide low-profile such that, in the initial resting state, the serpentine spring has a thickness no more than 0.5. cm. Further, the serpentine spring may be constructed of music wire.

In another embodiment, at least one of the first arm or second arm may be in the shape of at least one: U-shaped, zigzag, or curved. Additionally, the coupler may include a cover.

In another embodiment, the clip may include a third arm configured to attach to the housing of the wearable device via a third hinge. Additionally, the third arm may be configured to secure the coupler once the wearable device has been affixed to an external object. Further, the third arm may be configured to work in tandem with the first arm and the second arm.

In another embodiment, a guide may be attached to the coupler, and the guide may be configured to assist with affixing the wearable device to an external object. Additionally, the first hinge may be configured such that the first arm can be detached from the housing, and the second hinge may be configured such that the second arm can be detached from the housing. In another embodiment, a clip mechanism comprising: a board, a first arm configured to attach to a first hinge of the board; a second arm configured to attach to a second hinge of the board; a coupler configured to connect the first arm to the second arm, comprising an elastic member, wherein the elastic member is configured to cause the coupler to change a distance from a side of the board.

DETAILED DESCRIPTION

Figure 1A:
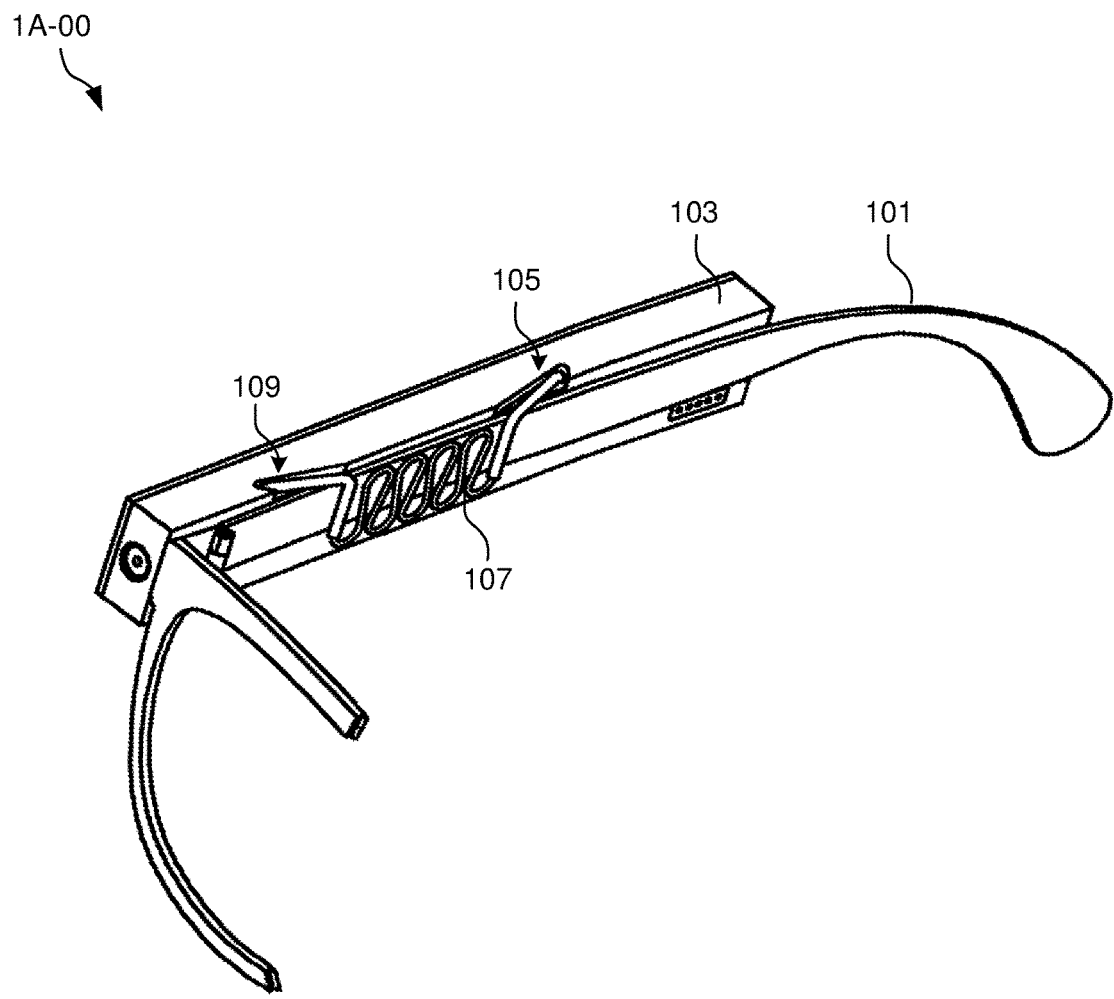
FIG. 1A is a clip mechanism for wearable devices, in accordance with one embodiment.

FIG. 1A illustrates a clip mechanism 1A-00 for wearable devices, in accordance with one embodiment.

As shown, the clip mechanism 1A-00 includes a housing 103, a first arm 105, and second arm 109, an expandable coupler 107, and an external object 101. In the context of the present description, the clip mechanism may refer and/or include, at a minimum, the first arm 105, the second arm 109, and the expandable coupler 107. Such a clip mechanism may be attached to and/or integrated within a wearable device (such as the device including the housing 103). Additionally, the external object 101 may be any object to which the clip mechanism may be affixed. In this manner, the clip mechanism may be affixed to an eyeglasses frame, a hat, an article of clothing, an accessory (jewelry, watch, etc.) which may be on a user, etc. In other embodiments, the clip mechanism may be affixed directly to the body (e.g. around the wrist, around the neck, on the ear, on a finger, etc.).

The first arm 105 may be configured to attach to a first inset of the housing 103 of the wearable device via a first hinge. Additionally, the second arm 109 may be configured to attach to a second inset of the housing 103 of the wearable device via a second hinge. Additionally, the expandable coupler 107 may connect the first arm 105 and the second arm 109. Additionally, in when the expandable coupler 107 is expanded beyond an initial resting state, the expandable coupler 107 may exert an increased force to pull the first arm 105 and the second arm 109 together to return to the initial resting state. In this manner, when the expandable coupler 107 is expanded (and hence the first arm 105 and the second arm 109 are swung away from the housing 103), the expandable coupler 107 may hold elastic potential energy as a result of the deformation (i.e. expansion), and may therefore seek to return to the initial resting state (i.e. lower stored potential stored energy) associated with the expandable coupler 107.

In one embodiment, the first arm 105 and the second arm 109 may each include an attachment section at a first end, a linking section at a second end, and a lever section between the first end and the second end. For example, the attachment section at the first end may be inserted into the respective inset of the housing 103. The linking section at the second end may be used to attach to the expandable coupler 107. Additionally, the lever section may be used to control the distance to which the expandable coupler is separated from the housing 103. For example, the longer the distance of the linking section, the greater the distance that the arm (such as the first arm 105 and/or the second arm 109) may swing away from the housing 103. In this manner, the first arm 105 may be configured such that when the first arm 105 rotates around the first hinge, the linking section changes a distance from a side of the housing 103. Additionally, the second arm 109 may be configured such that when the second arm 109 rotates around the second hinge, the linking section changes a distance from a side of the housing 103.

Still yet, when the first arm 105 rotates around the first hinge and when the second arm 109 rotates around the second hinge, a gap between the expandable coupler 107 and the housing 103 may increase. Additionally, the gap may be used to host the external object 101 (or any object to which the wearable should be affixed). In one embodiment, when the first arm 105 rotates around the first hinge and when the second arm 109 rotates around the second hinge, the expandable coupler 107 may expand and increase in tension (and hold elastic potential energy). Additionally, in one embodiment, the rotation of the first arm 105 around the first hinge and the rotation of the second arm 109 around the second hinge may occur in opposite rotation directions (i.e. they are both turning outwards from the housing 103).

Further, the expansion of the expandable coupler 107 may create a gap, and the gap may be used to host the external object 101, and the external wearable device (including the clip mechanism) may be held to the external object 101 by a combination of at least one of: friction of the surface of the wearable device (such as of the housing 103) and of the surface of the external object 101, or the tension (such as of the expanded expandable coupler 107). Additionally, when the expandable coupler 107 is expanded, a gap may be created between the wearable device and the expandable coupler 107, and the external object 101 can be hosted within the gap such that the wearable device may be affixed to the external object 101 based on at least one of: friction of the surface of the external object 101, friction of the surface of the wearable device (such as of the housing 103), a biasing force from the first arm 105 and the second arm 109, or a tension of the expandable coupler 107.

In one embodiment, the expandable coupler 107 may be a serpentine spring. Additionally, the serpentine spring may be configured to provide a low-profile such that, in the initial resting state, the serpentine spring may have a thickness up to 0.5 cm. Further, the serpentine spring may be constructed of music wire. Constructing the serpentine spring of music wire may allow for high tensile strength, high ductility and increased fatigue life. For example, the music wire may have minimum tensile strength of 230,000-400,000 PSI (compared to standard 304 stainless steel wire which may have tensile strength of around 74,000 PSI). As such, constructing the expandable coupler 107 in the shape of a serpentine spring and with music wire allows for an expandable clip that is extremely strong, resists permanent deformation, and lasts longer than conventional spring options.

In one embodiment, at least one of the first arm 105 or second arm 109 may be in the shape of at least one: U-shaped, zigzag, or curved. The selection of the design of the first arm 105 and/or the second arm 109 may be dictated, at least in part, by the external object 101 to which it is to be affixed. In this manner, if the external object 107 has a specific width, component construction (wide arm at a first point and narrow at a second, etc.), etc. the clip mechanism (and the first arm 105 and/or the second arm 109 in particular) may be configured so that the arm length (in combination with the length of the expandable coupler 107) is made specific to the external object 101 to which it is to be affixed.

Still yet, in one embodiment, the expandable coupler 107 may include a cover. The cover may be removable, or in other cases, the cover may be permanently integrated into the expandable coupler 107. Additionally, the clip mechanism may include a third arm (not shown in FIG. 1A but shown in some subsequent figures such as but not limited to FIG. 19A) configured to attach to a third inset of the housing 103 of the wearable device via a third hinge. Additionally, the third arm may be configured to secure the expandable coupler 107 once the wearable device has been affixed to the external object 101. For example, in one embodiment, the third arm may be affixed to the housing 103 on a side opposite the first inset and the second inset such that, after the expandable coupler 107 is affixed to the external object 101, the third arm rotates out on the third hinge and attaches to the expandable coupler 107 such that the first arm 105 and the second arm 109 provide a support on a top side of the external object 101 and the third arm provides a support on a bottom side of the external object 101. Further, the third arm may be configured to work in tandem with the first arm 105 and the second arm 109.

Figure 8A:
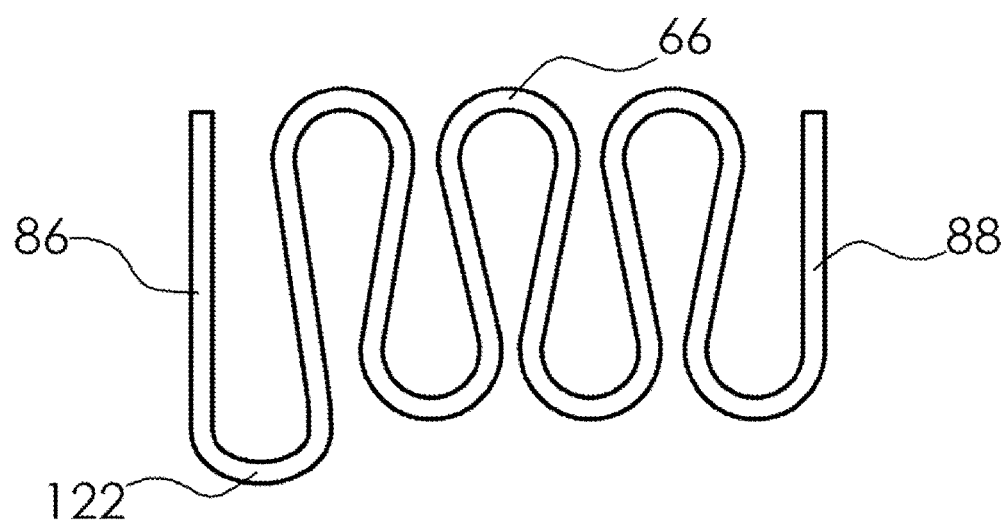
FIG. 8A is a front view and a bottom view (below) of a coupler spring with a guide section, in accordance with one embodiment.
Figure 8A:
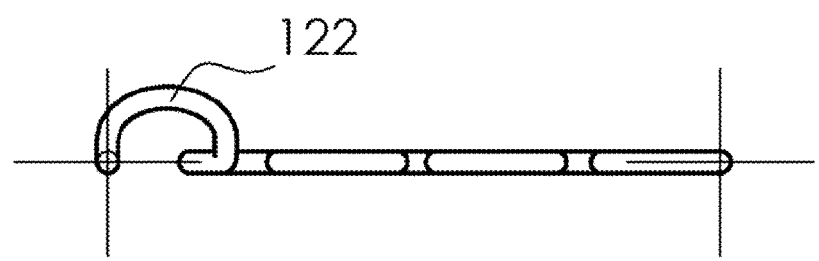

Additionally, in one embodiment, a guide may be attached to the expandable coupler 107, and the guide may be configured to assist with affixing the wearable device to the external object 101 (such as shown hereafter in, e.g., FIG. 8A). Additionally, the first inset may be configured such that the first arm 105 can be detached from the housing 103, and the second inset may be configured such that the second arm 109 can be detached from the housing 103. Further, when the expandable coupler 107 is expanded, the expandable coupler 107 may remain substantially parallel to the housing 103 of the wearable device. For example, after the expandable coupler 107 is affixed to the external object 101, the force of the elastic potential energy will be applied near equally to the first arm 105 and to the second arm 109 such that, due to the equal force applied to each arm, the expandable coupler 107 will remain in a static state (near parallel) pressing the external object 101 to the housing 103.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
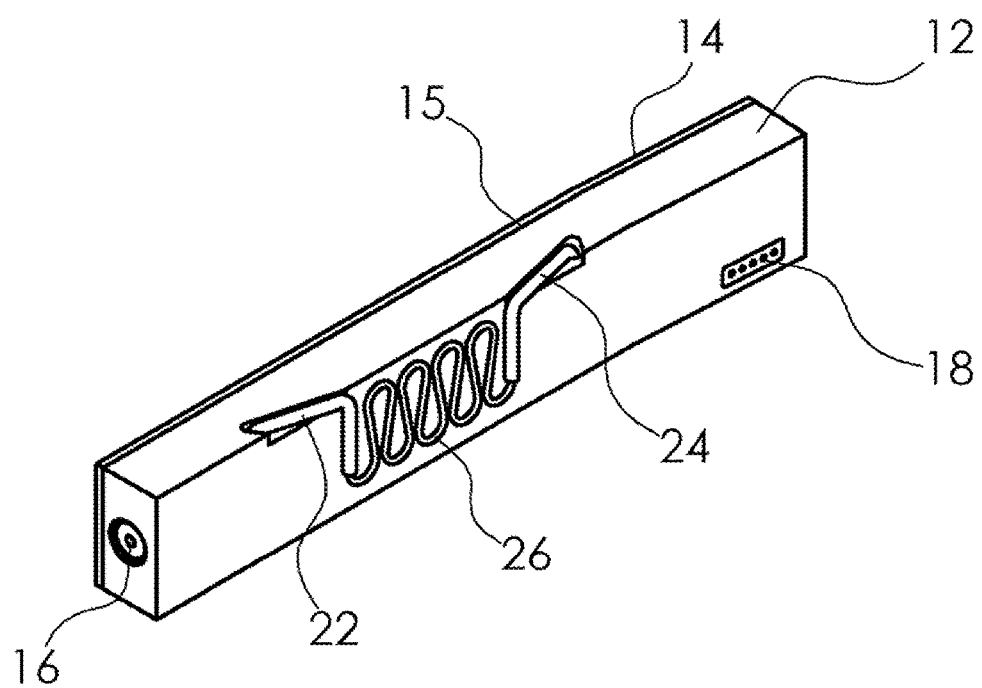
FIG. 1B is a perspective view of the wearable device which includes a clip arrangement constructed, in accordance with one embodiment.

FIG. 1B illustrates is a perspective view 1B-00 of the wearable device which includes a clip arrangement constructed, in accordance with one embodiment. As an option, the perspective view 1B-00 may be implemented in the context of any one or more of the embodiments set forth in any previous and/or subsequent figure(s) and/or description thereof. Of course, however, the perspective view 1B-00 may be implemented in the context of any desired environment. Further, the aforementioned definitions may equally apply to the description below.

As shown, FIG. 1B depicts a wearable device. In one embodiment, the wearable device may be worn on a temple of a user's eyeglasses. The device comprises a housing 12 for hosting electronic components and a companion cover 14 for the housing 12, a touchpad 15 attached on the interior surface of the housing cover 14, a camera 16 and a speaker 18. Not shown in the figures, the wearable device may comprise an application processor, a memory, a power management and specific sensor chips mounted on one or more printed circuit boards well as a USB port and a radio frequency antenna for external connections and a battery that powers the device. It is to be understood that the present description is not to be limited to any particular type of wearable devices and in fact may be made applicable to a wide variety of such devices.

As shown, a clip arrangement is attached to the housing 12 of wearable device, where the clip arrangement includes a first arm 22, a second arm 25, and a serpentine extension spring 26. It should also be understood that the shape of wearable device is only for illustration purpose. Particularly, the underlying mechanism of the clip arrangement may be applied to devices that need to attach to other types of objects such as hat brims.

Figure 1C:
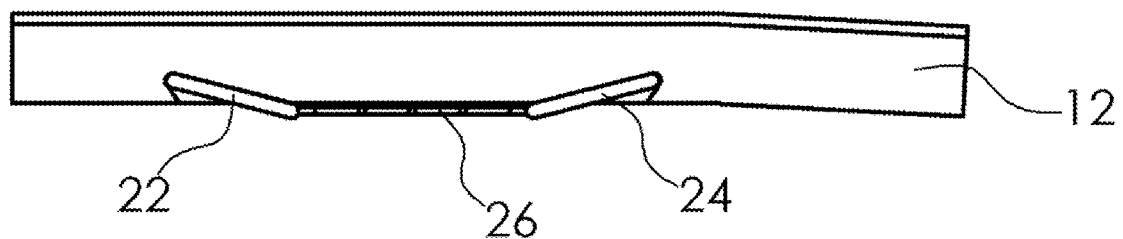
FIG. 1C is a top view of the wearable device in FIG. 1B where the clip arrangement is in a closed state, in accordance with one embodiment.

FIG. 1C illustrates a top view 1C-00 of the wearable device in FIG. 1B where the clip arrangement is in a closed state, in accordance with one embodiment. As an option, the top view 1C-00 may be implemented in the context of any one or more of the embodiments set forth in any previous and/or subsequent figure(s) and/or description thereof. Of course, however, the top view 1C-00 may be implemented in the context of any desired environment. Further, the aforementioned definitions may equally apply to the description below.

As shown, top view 1C-00 shows a clip arrangement attached to the housing 12 of wearable device, where the clip arrangement include a first arm 22, a second arm 25, and a serpentine extension spring 26. It should also be understood that the shape of wearable device is only for illustration purpose. Particularly, the underlying mechanism of the clip arrangement may be applied to devices that need to attach to other types of objects such as hat brims.

Figure 1D:
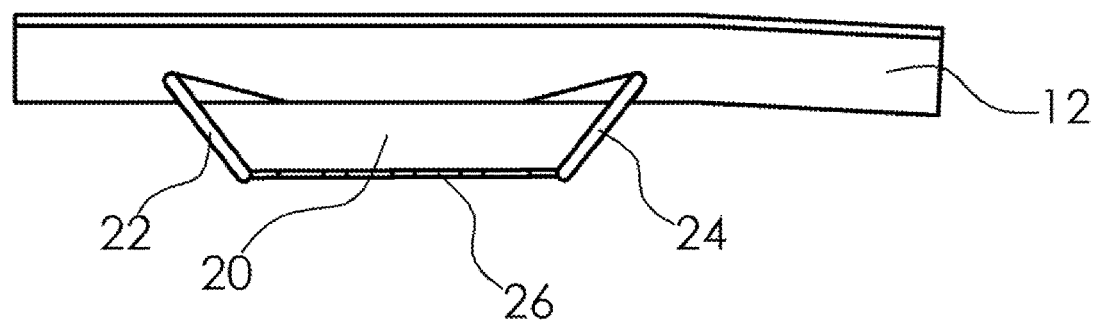
FIG. 1D is a top view of the wearable device in FIG. 1B when the clip arrangement is in an open state, in accordance with one embodiment.

FIG. 1D illustrates a top view 1D-00 of the wearable device in FIG. 1B when the clip arrangement is in an open state, in accordance with one embodiment. As an option, the top view 1D-00 may be implemented in the context of any one or more of the embodiments set forth in any previous and/or subsequent figure(s) and/or description thereof. Of course, however, the top view 1D-00 may be implemented in the context of any desired environment. Further, the aforementioned definitions may equally apply to the description below.

As shown, top view 1D-00 shows a clip arrangement attached to the housing 12 of wearable device, where the clip arrangement include a first arm 22, a second arm 25, a serpentine extension spring 26, and a gap or channel 20. It should also be understood that the shape of wearable device is only for illustration purpose. Particularly, the underlying mechanism of the clip arrangement may be applied to devices that need to attach to other types of objects such as hat brims.

The arrangement of the top view 1D-00 is shown where the first arm 22 and the second arm 24 are rotated such that the serpentine extension spring 26 is substantially parallel to the housing 12.

Figure 1E:
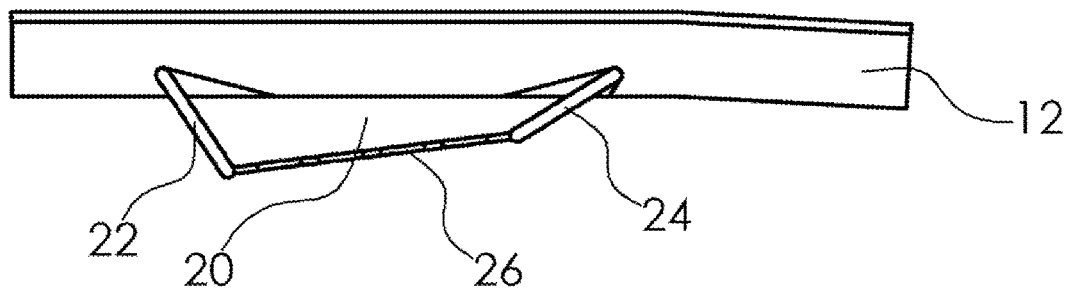
FIG. 1E is a top view of the wearable device in FIG. 1B when the clip arrangement is in another open state, in accordance with one embodiment.

FIG. 1E illustrates a top view 1E-00 of the wearable device in FIG. 1B when the clip arrangement is in another open state, in accordance with one embodiment. As an option, the top view 1E-00 may be implemented in the context of any one or more of the embodiments set forth in any previous and/or subsequent figure(s) and/or description thereof. Of course, however, the top view 1E-00 may be implemented in the context of any desired environment. Further, the aforementioned definitions may equally apply to the description below.

As shown, top view 1E-00 shows a clip arrangement attached to the housing 12 of wearable device, where the clip arrangement include a first arm 22, a second arm 25, a serpentine extension spring 26, and a gap or channel 20. It should also be understood that the shape of wearable device is only for illustration purpose. Particularly, the underlying mechanism of the clip arrangement may be applied to devices that need to attach to other types of objects such as hat brims.

The arrangement of the top view 1E-00 is shown where the first arm 22 and the second arm 24 are rotated such that the serpentine extension spring 26 is not parallel to the housing 12 (but may be substantially parallel nonetheless). In this manner, the first arm 22 and the second arm 24 may take into account differing dimensions (e.g. a tapering decreasing width arm, etc.) of the external object to which the housing 12 is to be affixed.

Figure 2:
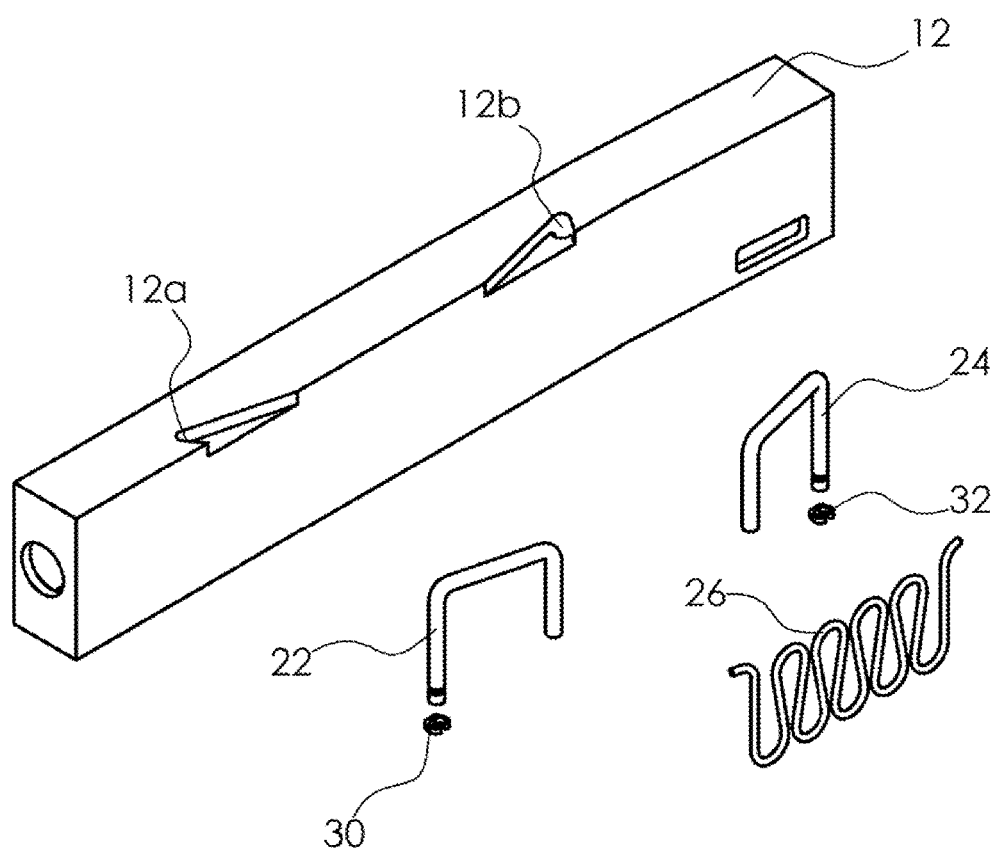
FIG. 2 is an exploded view of the clip arrangement for the wearable device in FIG. 1B, in accordance with one embodiment.

FIG. 2 illustrates an exploded view 2-00 of the clip arrangement for the wearable device in FIG. 1B, in accordance with one embodiment. As an option, the exploded view 2-00 may be implemented in the context of any one or more of the embodiments set forth in any previous and/or subsequent figure(s) and/or description thereof. Of course, however, the exploded view 2-00 may be implemented in the context of any desired environment. Further, the aforementioned definitions may equally apply to the description below.

As shown, the clip arrangement comprises a first arm 22, a second arm 24, and a serpentine extension spring 26. Additionally, one side of the first arm 22 may be hinged in a first hinge bearing 12a of the housing 12 and one end of the second arm 24 may be hinged in a second hinge bearing 12b of the housing 12. In addition, the serpentine extension spring 26 connects with the first arm 22 and second arm 24 at their other ends, respectively. FIG. 3 and FIG. 4 further illustrate the clip arrangement. In one embodiment, the first arm 22 and the second arm 24 may be U-shaped.

In one embodiment the housing 12 may be made of various materials such as plastic ABS/PC alloys. It should be noted that the clip arrangement may induce significant force on the housing 12 via the first hinge bearing 12a and the second hinge bearing 12b. To increase its mechanical strength and to reduce deformation during clip arrangement operation, the housing 12 may comprise an embedded injection molding component combining metal and plastics. Additionally, the housing 12 made by the above embedded molding may also have thinner walls and hence reduce the overall size of the wearable device due to the fact that metals (such as various steel and aluminum alloys) generally feature higher yield strength and elasticity modulus than plastics.

Figure 3A:
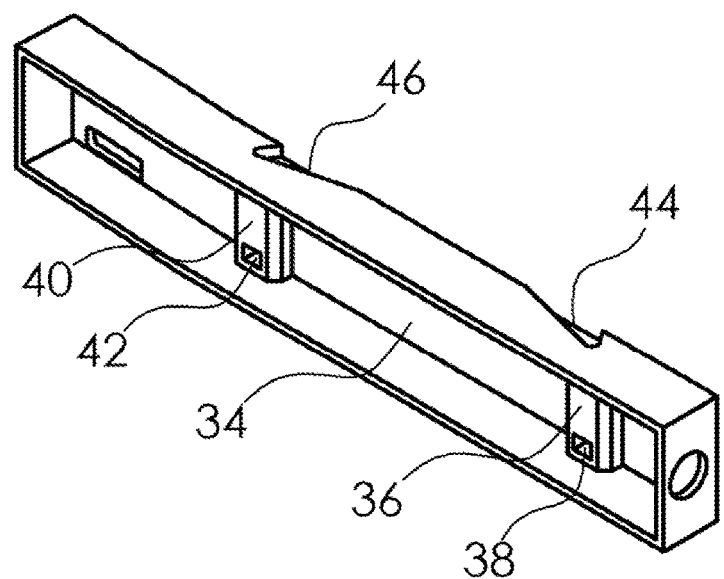
FIG. 3A is a perspective view of the housing of the wearable device in FIG. 1B, in accordance with one embodiment.
Figure 3B:
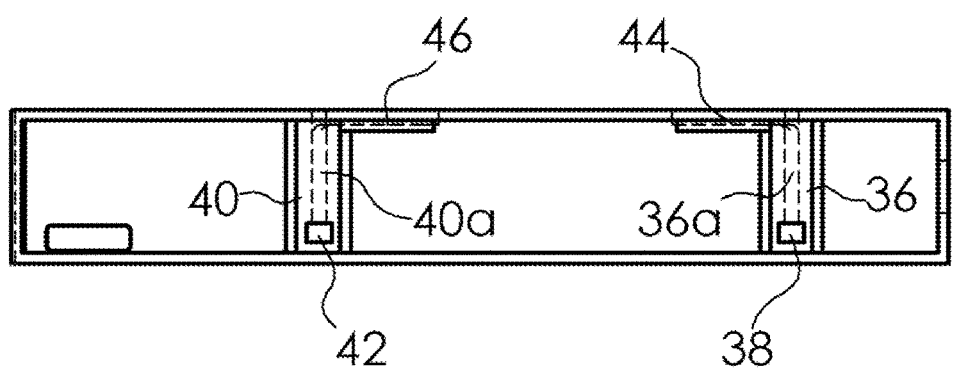
FIG. 3B is a front view of the housing in FIG. 3A from one side of the housing, in accordance with one embodiment.

FIG. 3A illustrates a perspective view 3A-00 of the housing of the wearable device in FIG. 1B, in accordance with one embodiment, and FIG. 3B illustrates a front view 3B-00 of the housing in FIG. 3A from one side of the housing, in accordance with one embodiment. As an option, the perspective view 3A-00 and front view 3B-00 may be implemented in the context of any one or more of the embodiments set forth in any previous and/or subsequent figure(s) and/or description thereof. Of course, however, the perspective view 3A-00 and front view 3B-00 may be implemented in the context of any desired environment. Further, the aforementioned definitions may equally apply to the description below.

As shown, the housing 12 comprises a space 34 for hosting electronic components of wearable device 10, a first hinge bearing 12a, and a second hinge bearing 12b. In addition, the first hinge bearing 12a comprises a support 36 and a hole 36a. Additionally, the second hinge bearing 12b comprises a support 40 and a hole 40a. Further, the first hinge bearing 12a may have an opening 38 for hosting a first retaining ring 30 to hold the first arm 22 in place. Further still, the second hinge bearing 12b may have an opening 42 for hosting a second retaining ring 32 to hold the second arm 24 in place. Even further, at the top of the housing 12, there may be a first step-down area 44 around the opening of the first hinge bearing 12a, which may allow the first arm 22 to be installed even in height with the top surface of the housing 12 and for it to move freely after installation in the first hinge bearing 12a. In addition, there may be a second step-down area 46 around the opening of the second hinge bearing 12b for the second arm 24 to provide for similar free movement of the second arm 24.

Figure 3C:
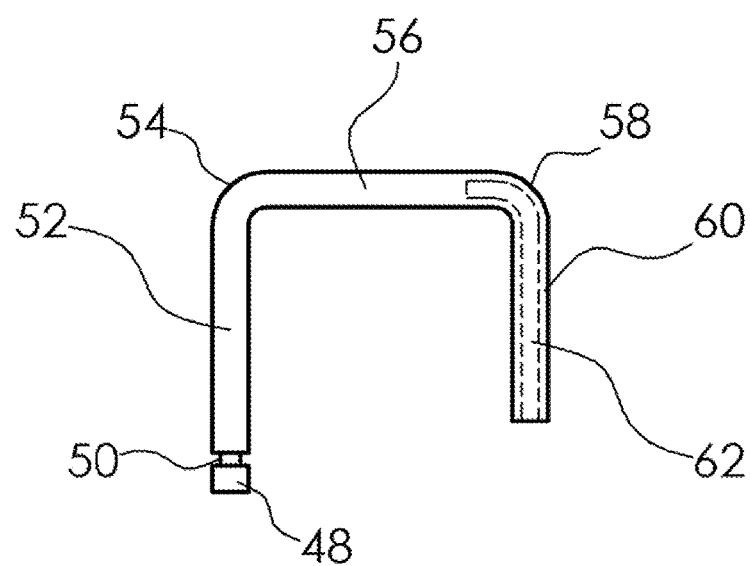
FIG. 3C is a front view of an arm of the clip arrangement in FIG. 1B, in accordance with one embodiment.

FIG. 3C illustrates a front view 3C-00 of an arm of the clip arrangement in FIG. 1B, in accordance with one embodiment. As an option, the front view 3C-00 may be implemented in the context of any one or more of the embodiments set forth in any previous and/or subsequent figure(s) and/or description thereof. Of course, however, the front view 3C-00 may be implemented in the context of any desired environment. Further, the aforementioned definitions may equally apply to the description below.

As shown, a first arm 22 is generally a U-shaped apparatus, comprising an attachment section 52, a lever section 56, and a linking section 60. In addition, the attachment section 52 may be installed to a hinge bearing of the aforementioned housing. Additionally, the linking section 60 comprises a hole 62 to host one end of the serpentine extension spring 26 so as to connect the arm with the serpentine extension spring 26. In one embodiment, when installed to a hinge bearing such as first hinge bearing 12a of the housing 12, the attachment section 52 may be held in place using any suitable approach to securing a hinge structure. For example, the attachment section 52 may comprise a groove 50 toward one end 48 of the first arm 22 to receive the second retaining ring 32 via the opening 38 of the first hinge bearing 12a, and is thus held in place by the retaining ring. It should be noted that the structure of the second arm 24 may be similar to that of the first arm 22.

In another embodiment, depending on the actual use of wearable device 10, the first arm 22 and/or the second arm 24 may be made of any material such as plastics and a metal alloy with sufficient elasticity modulus and yield strength so that they are rigid enough to avoid too much deformation and may not fail due to physical stress. For example, if overall size is a requisite component of the wearable device, as is the case for an apparatus like wearable device 10, high elasticity modulus and yield strength are needed for the arms. In that case, the arms may be made of metal such as a high-carbon steel alloy with high yield strength.

In yet another embodiment, within the mechanical strength of the material, first transition section 54 and second transition section 58 may be made as short or as sharp as possible so as to minimize the chances of the top of the target object stopping at the transition sections instead of under the lever section of the arm when the target object is gripped by the clip arrangement. In another embodiment, the transition sections may, however, be longer or wider to reduce their internal stress during operation of the clip arrangement so that the transition sections do not get in the way of the target object to be fully received toward the lever sections of their respective arms.

Figure 3D:
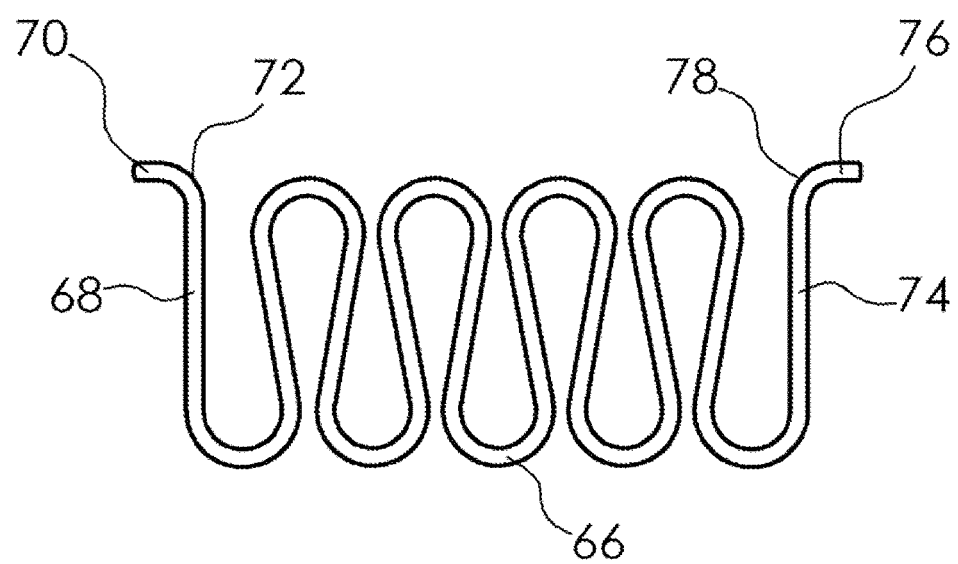
FIG. 3D is a front view of a serpentine coupler spring for the clip arrangement in FIG. 1B, in accordance with one embodiment.

FIG. 3D illustrates a front view 3D-00 of a serpentine coupler spring for the clip arrangement in FIG. 1B, in accordance with one embodiment. As an option, the front view 3D-00 may be implemented in the context of any one or more of the embodiments set forth in any previous and/or subsequent figure(s) and/or description thereof. Of course, however, the front view 3D-00 may be implemented in the context of any desired environment. Further, the aforementioned definitions may equally apply to the description below.

As shown, the serpentine extension spring 26 comprises an inner section 66 and first side section 68 and second side section 74. In addition, the first side section 68 comprises a first flat terminal section 70 and a third transition section 72. Similarly, the second side section 74 comprises a second flat terminal section 76 and a fourth transition section 78. In one embodiment, depending on the actual aspects of wearable device 10, the spring may be made of any material with sufficient elasticity. In one embodiment, the serpentine extension spring 26 may be made of strong materials with high yield strength such as a music spring wire in order to meet the high stress demands induced on a spring during operation. Optionally, the inner section 66 of the serpentine extension spring 26 also need not be planar. For example, the serpentine extension spring 26 may be curved so that when assembled in the clip arrangement, it is biased toward the housing of the device, thus serving as an additional pressure on the target object during operation.

Figure 4A:
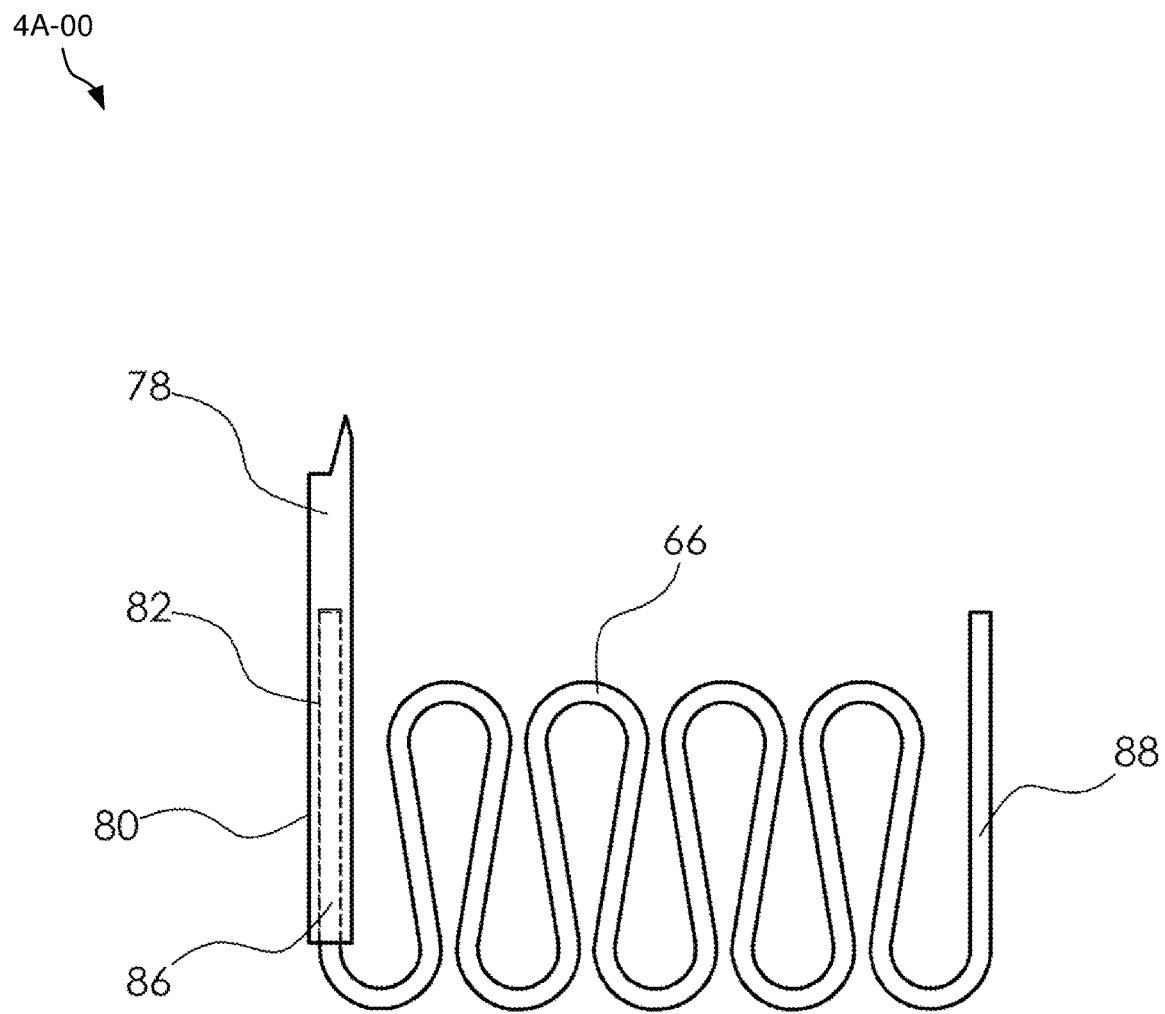
FIG. 4A is a front view of the coupler spring and the corresponding arm of the clip arrangement in FIG. 1B before they are formed to connect together, in accordance with one embodiment.

FIG. 4A illustrates a front view 4A-00 of the coupler spring and the corresponding arm of the clip arrangement in FIG. 1B before they are formed to connect together, in accordance with one embodiment. As an option, the front view 4A-00 may be implemented in the context of any one or more of the embodiments set forth in any previous and/or subsequent figure(s) and/or description thereof. Of course, however, the front view 4A-00 may be implemented in the context of any desired environment. Further, the aforementioned definitions may equally apply to the description below.

As shown, the serpentine extension spring 26 comprises of the inner section 66, a first straight side section 86, and a second straight side section 88. In addition, the first arm 22 comprises a straight section 80 with a hole 82 which may be made using a spark-erosion drilling machine. Additionally, the first straight side section 86 of the spring is positioned inside the hole 82 of the first arm 22. In one embodiment, the serpentine extension spring 26 and a first arm 22 may both be made of music spring wires.

Figure 4B:
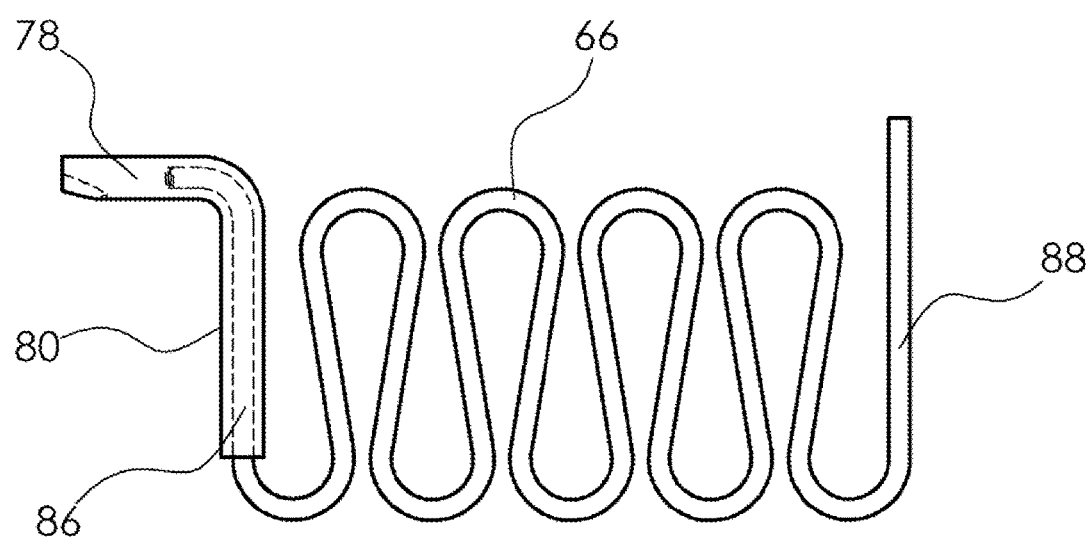
FIG. 4B is a front view of the coupler spring and the corresponding arm of the clip arrangement in FIG. 1B after they are formed to connect together, in accordance with one embodiment.

FIG. 4B illustrates a front view 4B-00 of the coupler spring and the corresponding arm of the clip arrangement in FIG. 1B after they are formed to connect together, in accordance with one embodiment. As an option, the front view 4B-00 may be implemented in the context of any one or more of the embodiments set forth in any previous and/or subsequent figure(s) and/or description thereof. Of course, however, the front view 4B-00 may be implemented in the context of any desired environment. Further, the aforementioned definitions may equally apply to the description below.

As shown, with the first straight side section 86 of the spring inside the hole 82, the straight section 80 of the first arm 22 is bent to form the connection of the arm with the spring as in FIG. 4B. In one embodiment, the first flat terminal section 70 of the serpentine extension spring 26 may be long enough so as to prevent the first straight side section 86 of the spring from sliding or being easily pulled away from the hole 82.

Figure 5A:
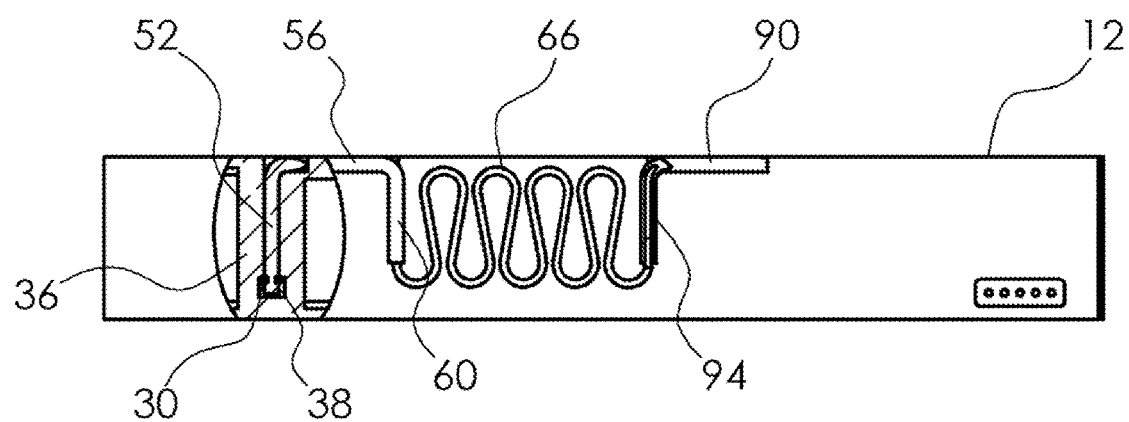
FIG. 5A is a front view of the wearable device in FIG. 1B after the clip arrangement is installed, broken-out sections showing the internal structure related to the clip arrangement, in accordance with one embodiment.

FIG. 5A illustrates a front view 5A-00 of the wearable device in FIG. 1B after the clip arrangement is installed, broken-out sections showing the internal structure related to the clip arrangement, in accordance with one embodiment. As an option, the front view 5A-00 may be implemented in the context of any one or more of the embodiments set forth in any previous and/or subsequent figure(s) and/or description thereof. Of course, however, the front view 5A-00 may be implemented in the context of any desired environment. Further, the aforementioned definitions may equally apply to the description below.

As shown, the attachment section 52 of the first arm 22 may be installed in the support 36 of the housing cover 14, and locked by the first retaining ring 30 inside the opening 38. In addition, the second arm 24 may be similarly attached to the housing 12. Further, the lever sections 56 and 90 of the first arm 22 and the second arm 24 may be roughly flush with the outer surface of the housing 12 on its top side. Additionally, the first arm 22 and the second arm 24 may be connected with the serpentine extension spring 26 at their linking sections 60 and 94, respectively.

As shown, FIG. 5A also illustrates the clip arrangement in a closed state, corresponding to the top view of wearable device in FIG. 1C. In one embodiment, for the device to clip onto a thin object resiliently, it is generally useful to design the serpentine extension spring 26 so that it is properly extended in this initial state and renders a sufficient bias force on the first arm 22 and the second arm 24.

Figure 5B:
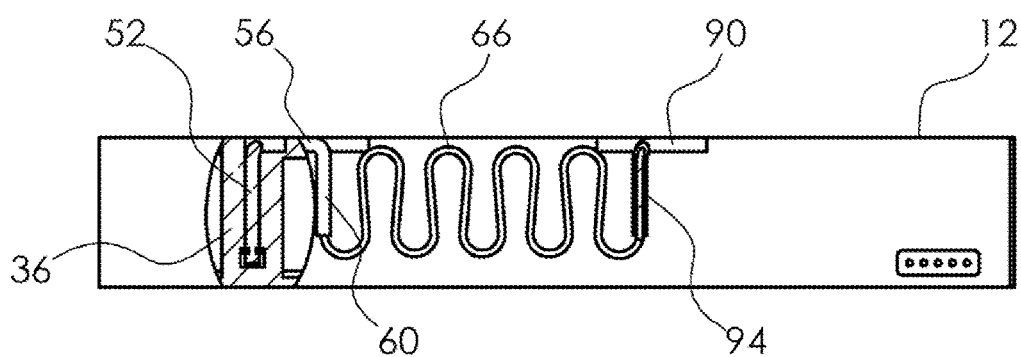
FIG. 5B is a front view of the wearable device in FIG. 1B when the clip arrangement is in an open state, in accordance with one embodiment.

FIG. 5B illustrates a front view 5B-00 of the wearable device in FIG. 1B when the clip arrangement is in an open state, in accordance with one embodiment. As an option, the front view 5B-00 may be implemented in the context of any one or more of the embodiments set forth in any previous and/or subsequent figure(s) and/or description thereof. Of course, however, the front view 5B-00 may be implemented in the context of any desired environment. Further, the aforementioned definitions may equally apply to the description below.

As shown, the clip arrangement is in an open state, corresponding to the top view of the device in FIG. 1D. To clip onto a target object, a user may first pull the linking sections 60 and 94 of the first arm 22 and the second arm 24 and the inner section 66 of the spring, separately or together, and away from the device housing. In one embodiment, as linking sections 60 and 94 are pulled away from the device housing, the clip arrangement moves into an open state. In another embodiment, a gap or a channel 20 (referring to FIG. 1D) may thus be formed from the inner section 66 of the spring and the linking sections 60 and 94 of the first arm 22 and the second arm 24 to the housing 12. In still another embodiment, as the channel becomes wider, it may progress far enough to host the target object. By way of further embodiment, once inside the channel, the target object cannot progress past lever sections 56 and 90 of the first arm 22 and the second arm 24 so long as the target object is longer than the inner section 66 of the spring. Additionally, in an open state, the first arm 22 and the second arm 24 may rotate away from one another around their respective hinge bearings, while the inner section 66 of the spring is further stretched, providing greater torque to the first arm 22 and the second arm 24.

Figure 6A:
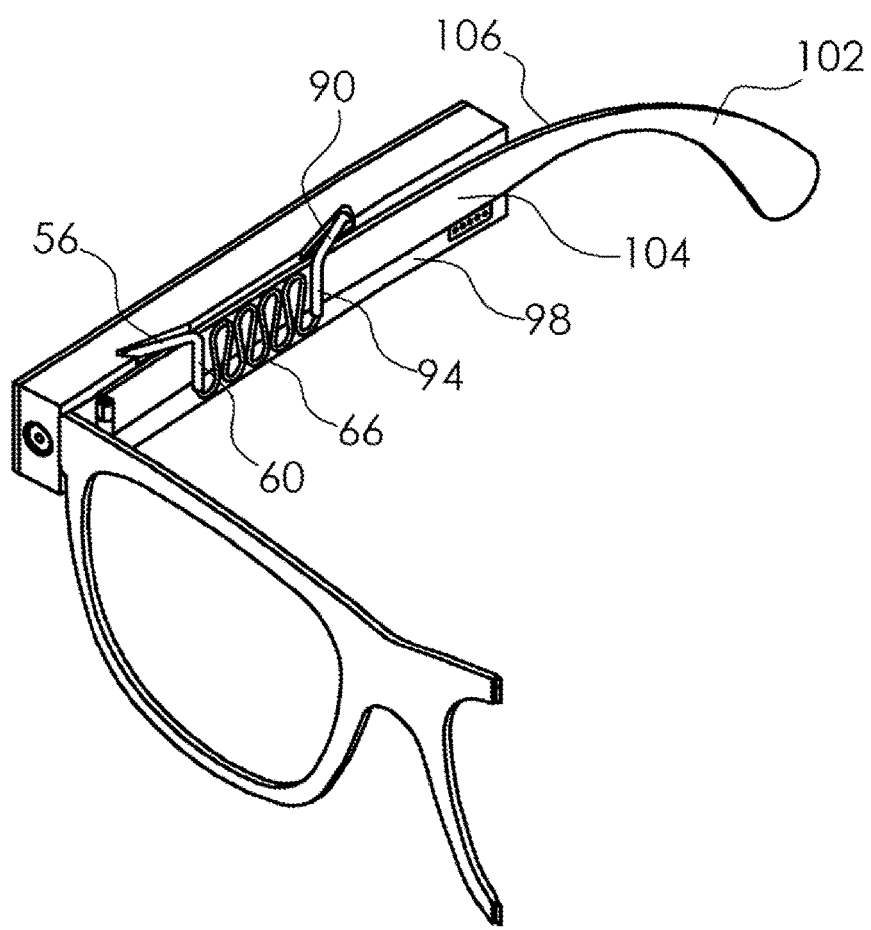
FIG. 6A is a perspective view of the wearable device in FIG. 1B where it clips onto a thin temple of a pair of eyeglasses, in accordance with one embodiment.

FIG. 6A illustrates a perspective view 6A-00 of the wearable device in FIG. 1B where it clips onto a thin temple of a pair of eyeglasses, in accordance with one embodiment. As an option, the perspective view 6A-00 may be implemented in the context of any one or more of the embodiments set forth in any previous and/or subsequent figure(s) and/or description thereof. Of course, however, the perspective view 6A-00 may be implemented in the context of any desired environment. Further, the aforementioned definitions may equally apply to the description below.

As shown, wearable device may grip onto a temple 102 of eyeglasses via the clip arrangement, where the linking section 60 of the first arm 22 and the linking section 94 of the second arm 24 press on one side 104 of the temple 102 and the outer surface 98 of the housing 12 presses on the other side 106 of the temple. In one embodiment, the inner section 66 of the serpentine extension spring 26 may press on the temple 102 where the inner section 66 is curved or biased toward the housing. Thus, the force exerted against the temple 102 by the clip arrangement and the housing 12 causes significant friction between them, preventing wearable device from moving off the temple 102.

Figure 6B:
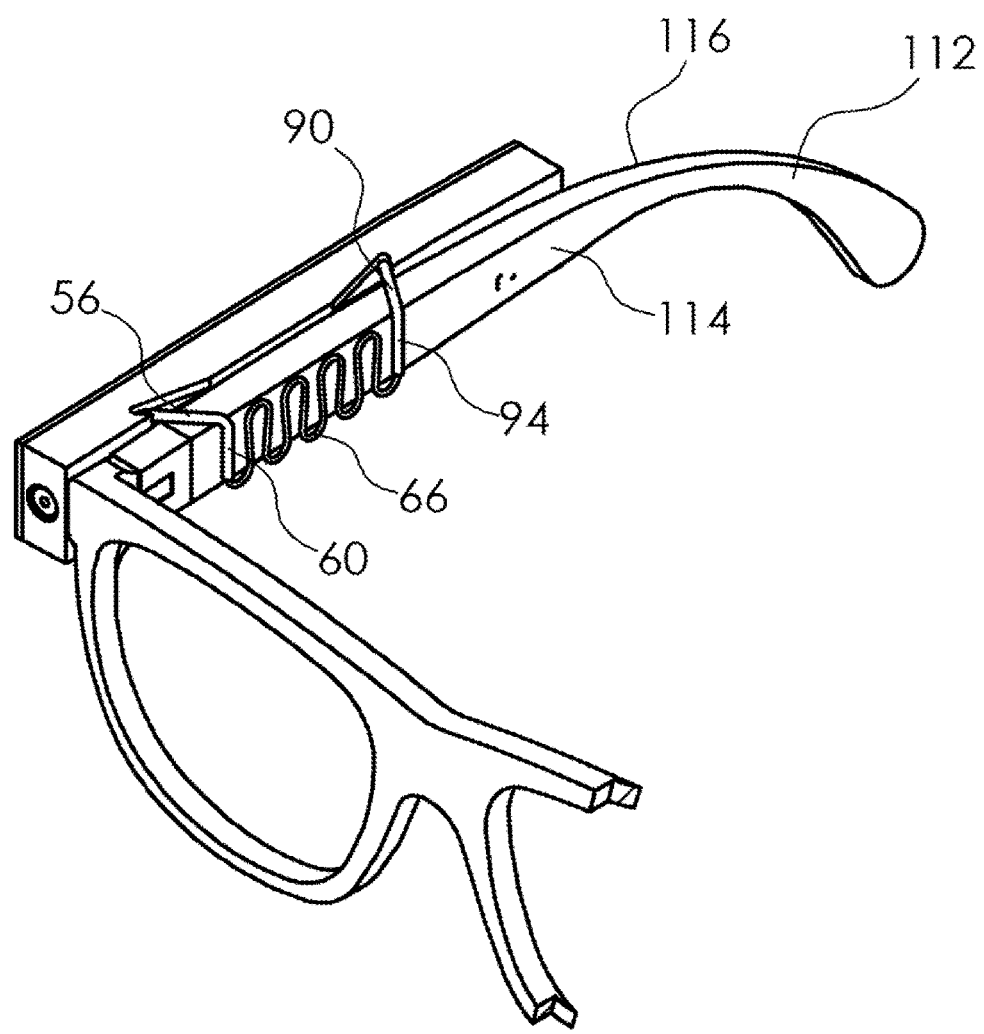
FIG. 6B is a perspective view of the wearable device in FIG. 1B where it clips onto a thick temple of a pair of eyeglasses, in accordance with one embodiment.

FIG. 6B illustrates a perspective view 6B-00 of the wearable device in FIG. 1B where it clips onto a thick temple of a pair of eyeglasses, in accordance with one embodiment. As an option, the perspective view 6B-00 may be implemented in the context of any one or more of the embodiments set forth in any previous and/or subsequent figure(s) and/or description thereof. Of course, however, the perspective view 6B-00 may be implemented in the context of any desired environment. Further, the aforementioned definitions may equally apply to the description below.

As shown, wearable device may grip onto a temple 112 of eyeglasses via the clip arrangement, where the temple 112 is thicker than the temple 102 in FIG. 6A. In one embodiment, the first arm 22 and the second arm 24 may rotate away from one another further than in FIG. 6A, wherein the serpentine extension spring 26 is further stretched causing the linking sections 60 and 94 (and hence the outer surface 98 of the housing 12) to exert more force on the temple 112. This configuration corresponds to the state of the clip arrangement shown in FIG. 1D.

Figure 6C:
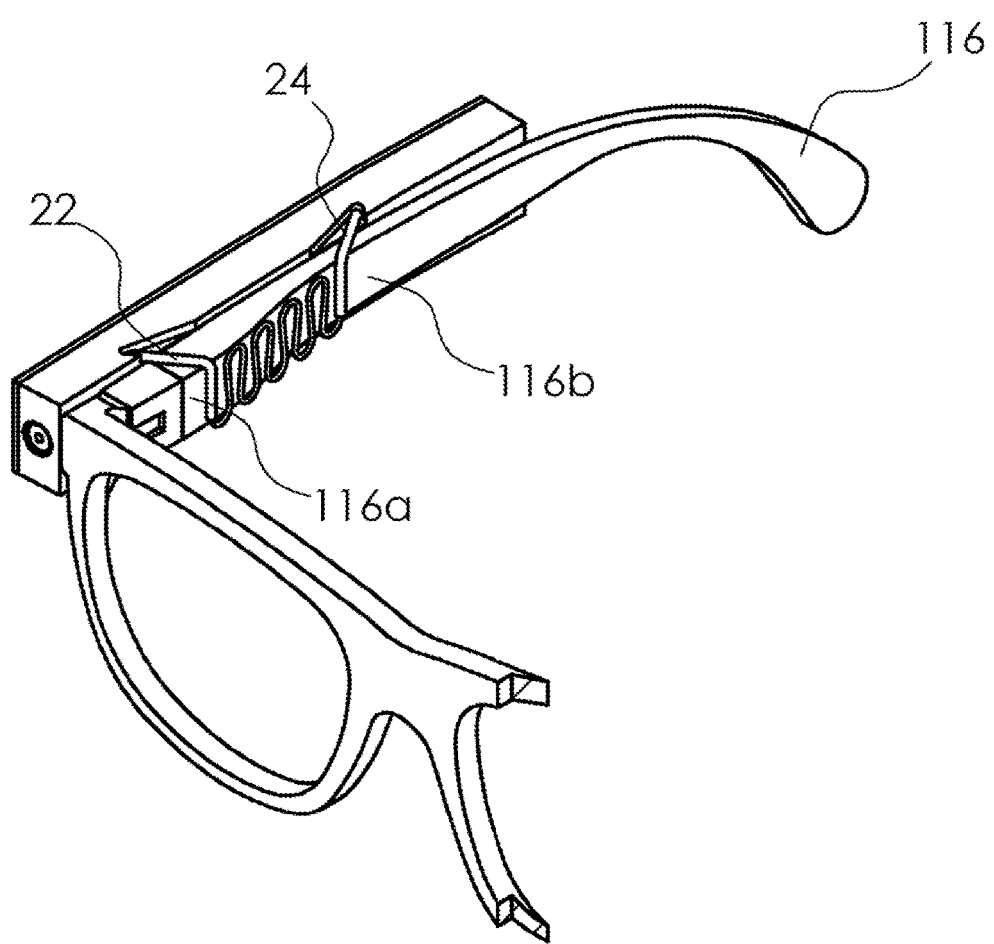
FIG. 6C is a perspective view of the wearable device in FIG. 1B where it clips onto a temple of a pair of eyeglasses with changing thickness where the device comes into contact with the temple, in accordance with one embodiment.

FIG. 6C illustrates a perspective view 6C-00 of the wearable device in FIG. 1B where it clips onto a temple of a pair of eyeglasses with changing thickness where the device comes into contact with the temple, in accordance with one embodiment. As an option, the perspective view 6C-00 may be implemented in the context of any one or more of the embodiments set forth in any previous and/or subsequent figure(s) and/or description thereof. Of course, however, the perspective view 6C-00 may be implemented in the context of any desired environment. Further, the aforementioned definitions may equally apply to the description below.

As shown, wearable device may grip onto a temple 116 of a similar pair of eyeglasses via the clip arrangement, where the temple 116 has uneven thickness, much thicker in the front 116a than in the middle 116b and in the back. In one embodiment, the clip arrangement naturally adapts to the unevenness, wherein the first arm 22 opens more than the second arm 24 and yet they still grip the temple tight. This configuration corresponds to the state of the clip arrangement shown in FIG. 1E where the shape of the channel 20 has automatically adjusted to fit the shape of the temple 116.

In another embodiment, to detach wearable device from the eyeglasses temple, a user can simply take wearable device upward off the temple (e.g., in a direction parallel to the temple surface of side 104 of the temple 102). The process described is a straightforward process and may be performed in a variety of ways. In one embodiment, the removal process may be performed using just a single hand without having to remove the eyeglasses. By way of example, the user may push the device upward at its rear bottom using the thumb while slightly pressing the device at this front top using the ring finger so that the device rotates vertically along the temple 116. Eventually, the linking section 94 of the second arm 24 loses contact with the temple, followed by the inner section 66 of the spring, and finally the linking section 60 of the first arm 22.

It should be noted that, with regards to the clip arrangement, the serpentine extension spring 26 is designed to limit movement of the first arm 22 and the second arm 24 and simultaneously assert force on the first arm 22 and the second arm 24, pulling them towards one another and against the housing 12, thus causing the first arm 22 and the second arm 24 to press onto the housing 12. In addition, the serpentine extension spring 26 provides lateral continuity with rigidity between the first arm 22 and the second arm 24. In one embodiment, the clip arrangement may gradually grip onto an eyeglasses temple or another target object, wherein, if the linking section 60 of the first arm 22 begins gripping on to the target object before the linking section 94 of the second arm 24, the first arm may rotate outward (i.e., it moves away from the outer surface 98 of the housing 12). Consequently, the side section of the serpentine extension spring 26 installed inside the linking section 60 of the first arm 22 may also move away from the housing 12, which may cause the inner section 66 of the spring to gradually move away from the housing 12. The latter example, in turn, may force the other side section of the spring (and hence the linking section 94 of the second arm 24) to gradually rotate away from the outer surface 98 of the housing 12. Eventually, the linking section 94 of the second arm 24 may begin to grip on to the target object. It should be noted that, due to its aforementioned multiple effects, the serpentine extension spring 26 may be a coupler spring or a coupler part of the clip arrangement.

It should also be noted that, with the rotation of the first arm 22, the first side section 68 of the serpentine extension spring 26 located in the linking section 60 of the arm may experience torque and be twisted accordingly because the first flat terminal section 70 of the spring (referring to FIG. 3D) is located in the lever section 56 of the first arm 22 cannot rotate freely. Additionally, in order to reduce the maximum torsional stress (usually within the third transition section 72 of the spring) in the first side section 68, an initial angle may be set between the lever section 56 of the first arm 22 and the first side section of the spring during the aforementioned bending process. In addition, once the clip arrangement is assembled, there may be corresponding torque at the end of the lever section 56 and the first side section 68 of the spring. Further, when the clip arrangement grips on a target object, this torque gradually decreases to zero with the increase of the thickness of the target object, and then gradually increases in the opposite direction. As such, the maximum torsional stress on the end of the spring is reduced. Further still, an optional value for the initial angle may be half of the maximum rotation angle designed for the first arm 22. In one embodiment, similar treatment may be applied during the bending process of the second arm 24 and the second side section 74 of the spring.

In one embodiment, a layer of soft material may be added to the linking section 60 of the first arm 22 to protect the eyeglasses temples from damages due to friction or scratching. For example, a layer of wear-resistant paint may be applied to or a silicone hose may be coated on the linking section 60. Such treatment may also add friction between the linking section and an eyeglasses temple, thus helping the clip arrangement to grip firmer onto the eyeglasses temple. It should be noted that similar treatment may be applied to the second arm 24, and the coupler spring may be treated similarly for the same reason.

It should also be noted that the internal tension that enables gripping of the clip arrangement in accordance with the present description may not necessarily originate from the aforementioned specific elastic components. Instead, internal tension may derive elasticity from different parts of the clip arrangement in any manner appropriate for the specific application. In addition, internal tension may derive elasticity from other parts such as the device housing 12 and individual sections of the arms.

Figure 7:
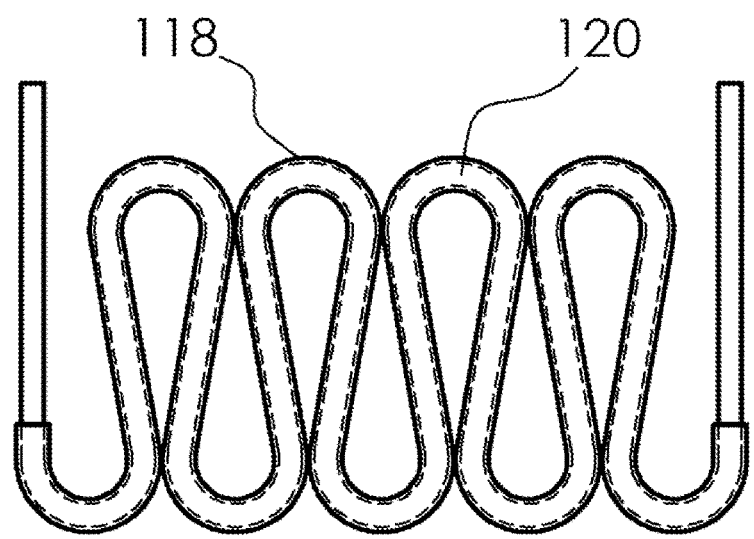
FIG. 7 is a front view of a coupler spring applied with a layer of silica, in accordance with one embodiment.

FIG. 7 illustrates a front view 7-00 of a coupler spring applied with a layer of silica, in accordance with one embodiment. As an option, the front view 7-00 may be implemented in the context of any one or more of the embodiments set forth in any previous and/or subsequent figure(s) and/or description thereof. Of course, however, the front view 7-00 may be implemented in the context of any desired environment. Further, the aforementioned definitions may equally apply to the description below.

In one embodiment, a thin layer of silica 118 may be applied to the inner section 120 of the spring by dipping with the spring extended. In another embodiment, the silica application may take place via spraying or possibly induced by chemical reaction.

FIG. 8A illustrates a front view and a bottom view 8A-00 of a coupler spring with a guide section, in accordance with one embodiment. As an option, the front view and bottom view 8A-00 may be implemented in the context of any one or more of the embodiments set forth in any previous and/or subsequent figure(s) and/or description thereof. Of course, however, the front view and bottom view 8A-00 may be implemented in the context of any desired environment. Further, the aforementioned definitions may equally apply to the description below.

As shown, a guide section 122 with an inclination angle may be added in the first arc section below the left side of the inner section of serpentine extension spring 26. Referring to FIGS. 3 and 4, the first straight side section 86 of serpentine extension spring 26 is connected to the first arm 22 whereas the second straight side section 88 is connected to the second arm 24. Therefore, when the serpentine extension spring 26 is added to wearable device 10, there is an angle between the guide section 122 and the outer surface 98 of the housing 12, forming a downward opening. In one embodiment, this opening may guide the gripping process of the clip arrangement. Additionally, when the opening of the guide section 122 contacts the upper side of an eyeglasses temple, the user may gradually apply pressure on wearable device against the target object, and the guide section 122 may be gradually opened. In another embodiment, due to the continuity of linking section 60 of the first arm 22 with the serpentine extension spring 26, the linking section 60 may gradually leave the outer surface 98 of the housing 12 and grip onto the target object. Further, the inner section 66 of the serpentine extension spring 26 may also be gradually opened away from the outer surface 98 of the housing 12 and grip onto the eyeglasses temple, while the linking section 94 of the second arm 24 may also be gradually opened with the inner section 66 of the serpentine extension spring 26 and grip onto the target object. In yet another embodiment, some guide sections may be added to the inner section 66 of the serpentine extension spring 26 to make it easier for the clip arrangement to grip onto target object such as an eyeglasses temple.

Figure 8B:
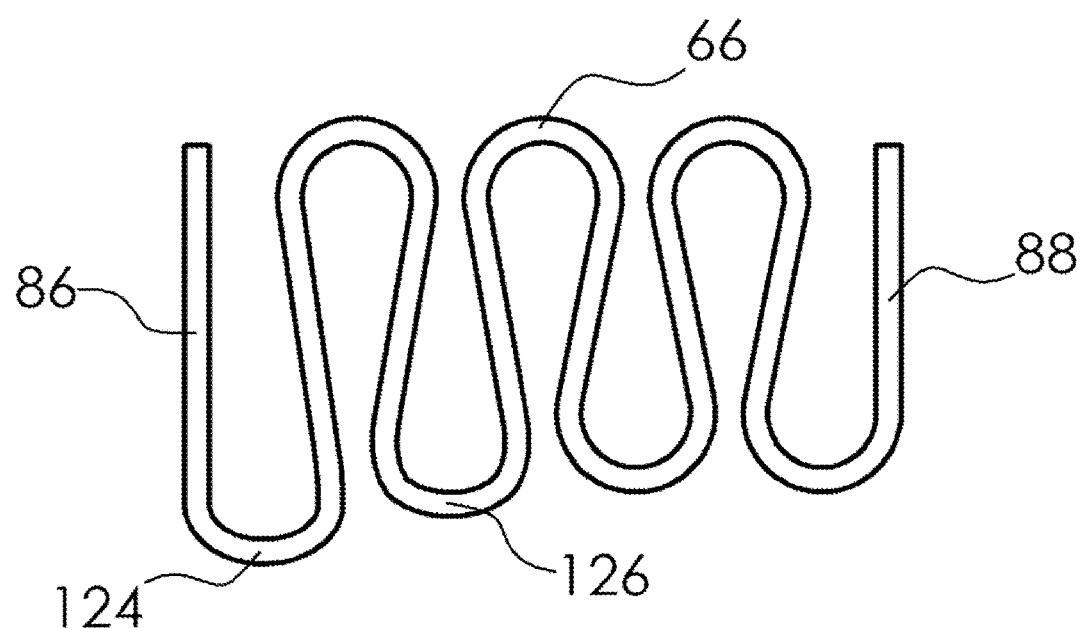
FIG. 8B is a front view and a bottom view (below) of a coupler spring with progressive guide sections, in accordance with one embodiment.
Figure 8B:
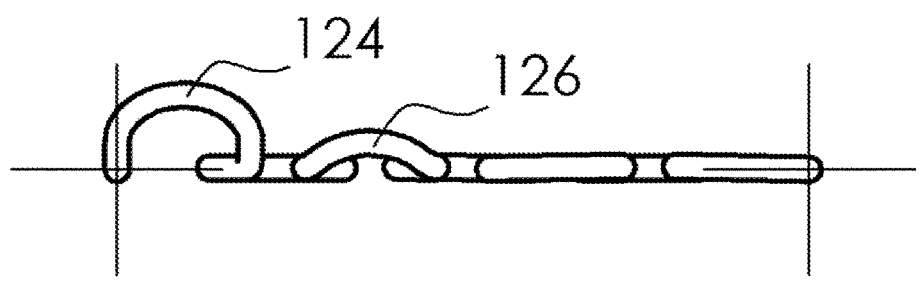

FIG. 8B illustrates a front view and a bottom view 8B-00 of a coupler spring with progressive guide sections, in accordance with one embodiment. As an option, the front view and bottom view 8B-00 may be implemented in the context of any one or more of the embodiments set forth in any previous and/or subsequent figure(s) and/or description thereof. Of course, however, the front view and bottom view 8B-00 may be implemented in the context of any desired environment. Further, the aforementioned definitions may equally apply to the description below.

As shown, two progressive guide sections 124 and 126 added to the serpentine extension spring 26 on its left side which may help with a smoother gripping experience. It should be noted that the addition of a guide section increases the corresponding arc length or the torque on the arc. In one embodiment, the diameters of the arcs with added guides may be designed larger to avoid over-stressing these arcs in order for the spring to maintain roughly the same elasticity on all arcs of its inner section. In another embodiment, a guide section may be added to the serpentine extension spring 26 at places other than the first arc section on the left, and according to the actual application, the guide section may be added to any arc of the inner section 66. In addition, multiple arcs of the inner section may have a guide section with a different size or shape.

In one embodiment, a user may attach the device onto an eyeglasses temple quickly via the addition of a guide section to the clip arrangement. In addition, a user may also do so using just one hand in a variety of manners, even while the eyeglasses are worn. For example, with the guide opening touch the top of the temple, the user may hold the temple at its bottom using a thumb and slide the device downward by pushing it at its top, using one or more of the other fingers of the hand, until the device fully clips on the temple. In another embodiment, a user may clip the device onto other target objects similarly. For example, in the case of a soft target object such as the placket of a T-shirt, a user may use his or her other hand to hold the object tight while clipping the device onto the target object.

Figure 9:
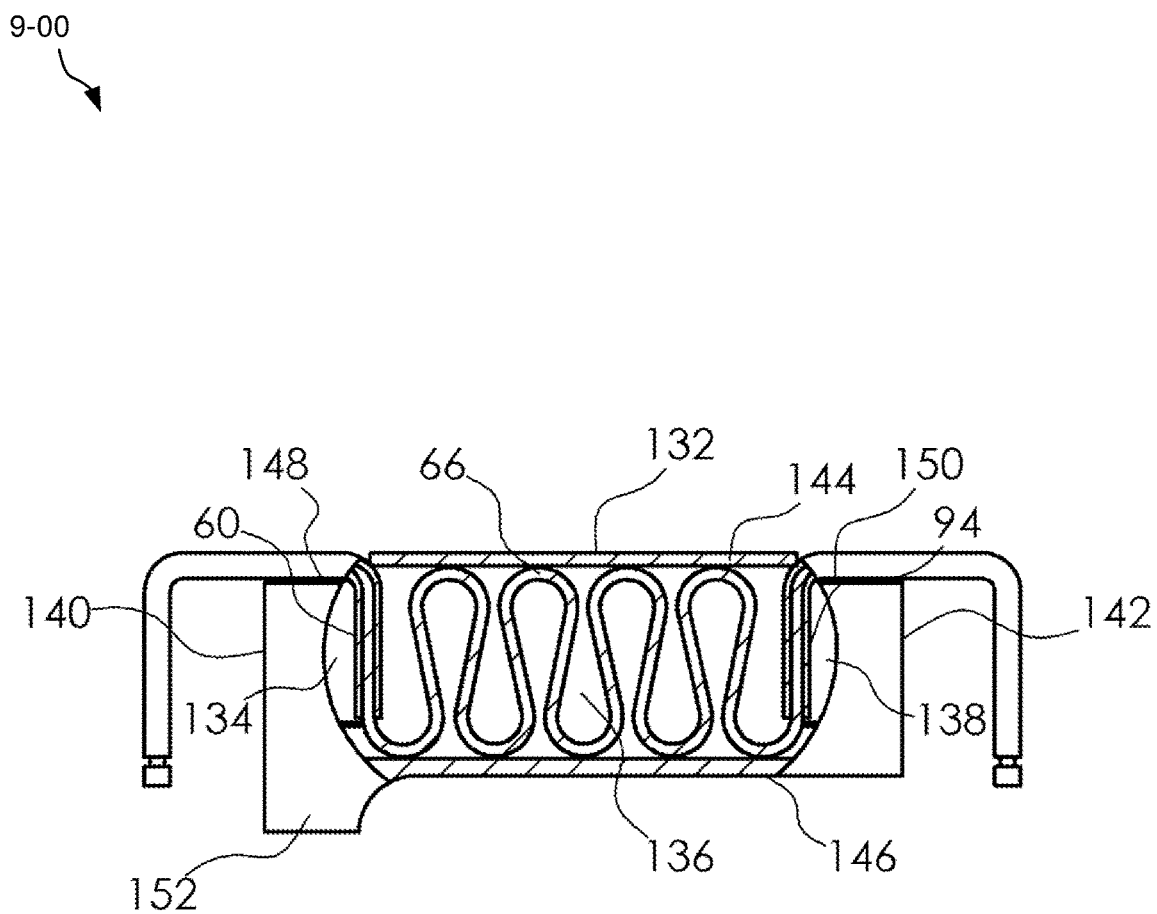
FIG. 9 is a front view of another clip arrangement comprising a case for the coupler part, in accordance with one embodiment.

FIG. 9 illustrates a front view 9-00 of another clip arrangement comprising a case for the coupler part, in accordance with one embodiment. As an option, the front view 9-00 may be implemented in the context of any one or more of the embodiments set forth in any previous and/or subsequent figure(s) and/or description thereof. Of course, however, the front view 9-00 may be implemented in the context of any desired environment. Further, the aforementioned definitions may equally apply to the description below.

As shown, the clip arrangement may include a case for the coupler spring. In addition, the case may increase the lateral rigidity or continuity of the coupler part, adjust the friction between the clip arrangement and the target object such as an eyeglasses temple, and ultimately protect the target object. In one embodiment, the case may comprise an empty space 136 to host the inner section 66 of the serpentine extension spring 26, another empty space 134 to host the linking section 60 of the first arm 22 (allowing for movement thereof), a left part of the serpentine extension spring 26 in extended configuration, and another empty space 138 to host the linking section 94 of the second arm 24 (also allowing for movement thereof), and a right part of the serpentine extension spring 26 in extended configuration.

In another embodiment, the case may incorporate side walls 140 and 142 along the empty spaces 136 and 138, respectively, in order to stop the linking sections 60 and 94 of the spring from moving out of the case and to prevent the spring from yielding to increased stress. In yet another embodiment, the case may also incorporate a top wall 144 and a bottom wall 146 so that the case may not separate from the serpentine extension spring 26. As such, the case may further incorporate a first step-down region 148 and a second step-down region 150 to host the movement of the lever section 56 of the first arm 22 and the lever section 90 of the second arm 24, respectively. In addition, the case may also incorporate a guide part 152 to make the gripping process quicker and smoother.

Figure 10:
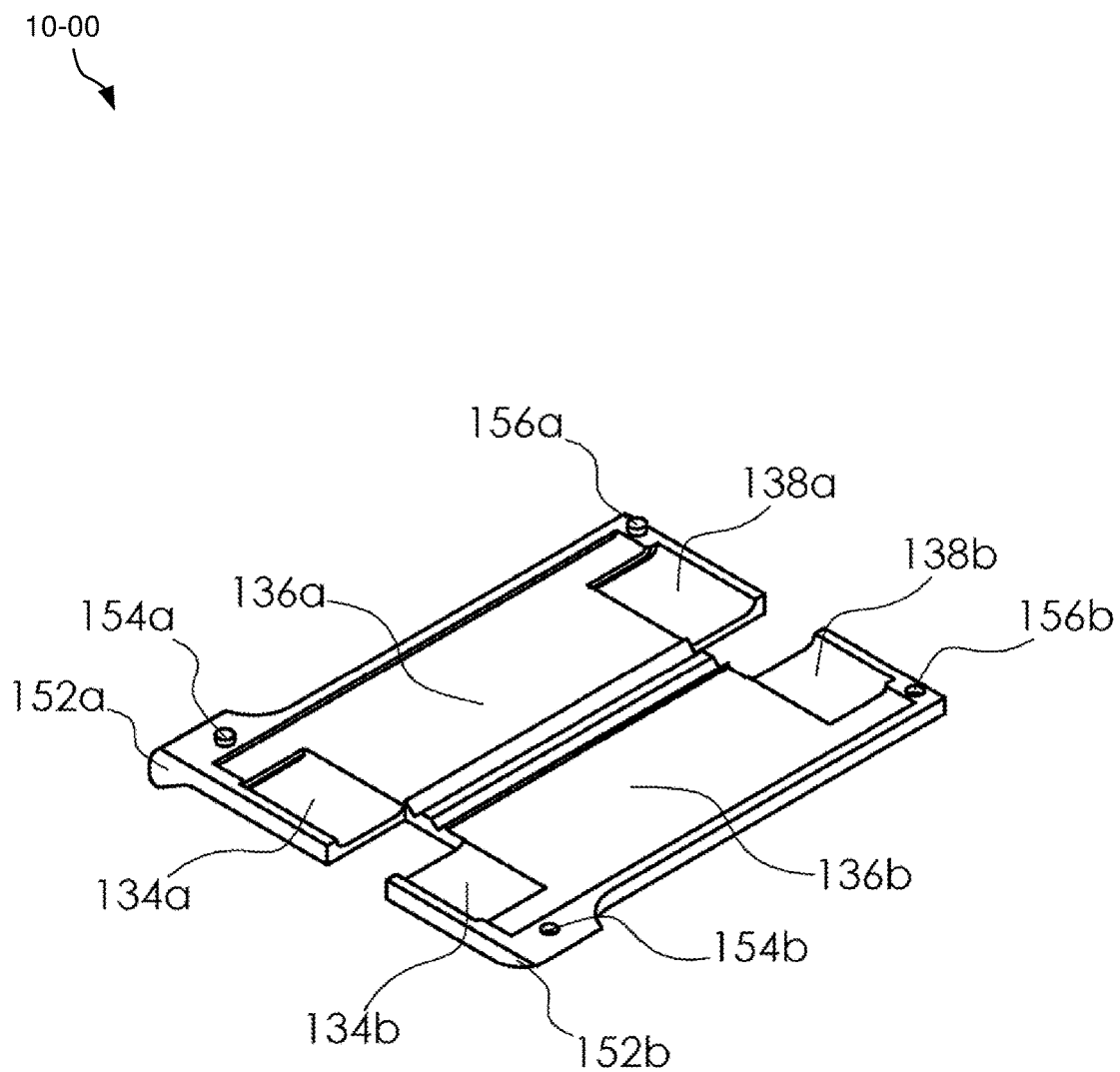
FIG. 10 is a perspective view of the case for the clip arrangement in FIG. 9 where the case is unfolded, in accordance with one embodiment.

FIG. 10 illustrates a perspective view 10-00 of the case for the clip arrangement in FIG. 9 where the case is unfolded, in accordance with one embodiment. As an option, the perspective view 10-00 may be implemented in the context of any one or more of the embodiments set forth in any previous and/or subsequent figure(s) and/or description thereof. Of course, however, the perspective view 10-00 may be implemented in the context of any desired environment. Further, the aforementioned definitions may equally apply to the description below.

As shown, prior to its assembly with the serpentine extension spring 26, the case may be a simple molded component (i.e., an approximately symmetric sheet as unfolded along the top wall 144 of the case) and each part of the molded component may correspond to a specific part of the case. For example, when the molded component is folded, indentations 134a and 134b form the empty space 134, indentations 136a and 136b form the empty space 136, indentions 138a and 138b form the empty space 138 and regions 152a and 152b form the guide part 152 and so on. Additionally, the molded component may incorporate a number of dovetail pins such as 154a and 156a and corresponding pits such as 154b and 156b to make dovetail joints when the component is folded. In one embodiment, the case may also be made of metal and/or other materials where suitable treatment may be applied to the surfaces of the case to protect eyeglasses temples or other target objects, or to make it suitable for skin contact. In another embodiment, the case may be made of one or more types of plastic.

Figure 11:
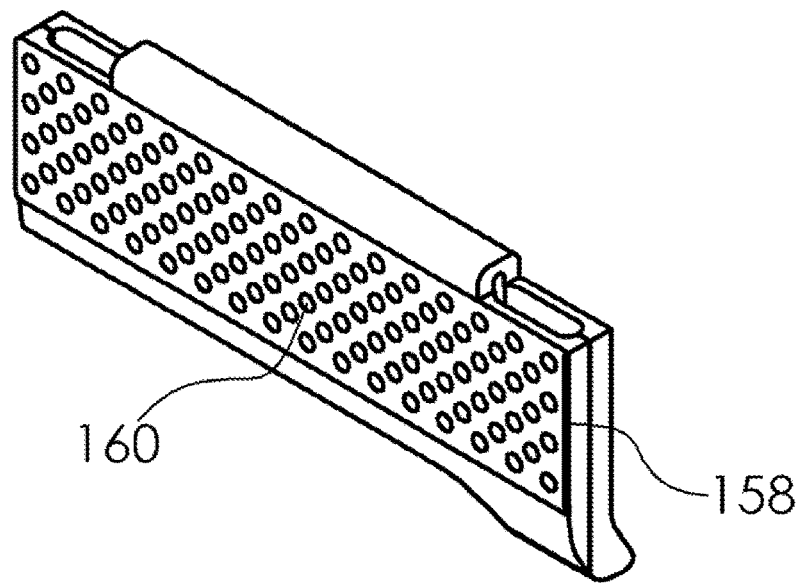
FIG. 11 is a perspective view of the case in FIG. 10 showing example treatments to its surface, in accordance with one embodiment.

FIG. 11 illustrates a perspective view 11-00 of the case in FIG. 10 showing example treatments to its surface, in accordance with one embodiment. As an option, the perspective view 11-00 may be implemented in the context of any one or more of the embodiments set forth in any previous and/or subsequent figure(s) and/or description thereof. Of course, however, the perspective view 11-00 may be implemented in the context of any desired environment. Further, the aforementioned definitions may equally apply to the description below.

As shown, the back side of the case (i.e., the outer surface of the case faced with the outer surface 98 of the housing 12) incorporates a thin silica film 158 with a number of protrusions 160. In addition, the silica film and protrusions may significantly increase the friction between the case and the target objects due to high friction coefficients inherent in common eyeglass temple materials such as resins, nylon, and metal. Additionally, the thin silica film 158 may be bond with the case using a proper adhesive or through other injection molding processes. In one embodiment, the case may incorporate various treatments to add its friction coefficient with the target objects such as eyeglass temples illustrated in FIGS. 6A-6C. In another embodiment, the first arm 22 and the second arm 24 of the clip arrangement may be of differing length and/or shape in order to better suit actual applications. In addition, for applications where the target objects on which the wearable device may clip have adequate thickness, the clip arrangement may be designed such that there is an initial gap between the coupler spring and/or the coupler case and the housing. This implementation may help reduce pressure between the coupler, the target object, and the housing of the device, reduce internal stress on the clip arrangement, and ultimately simplify clipping operation.

Figure 12A:
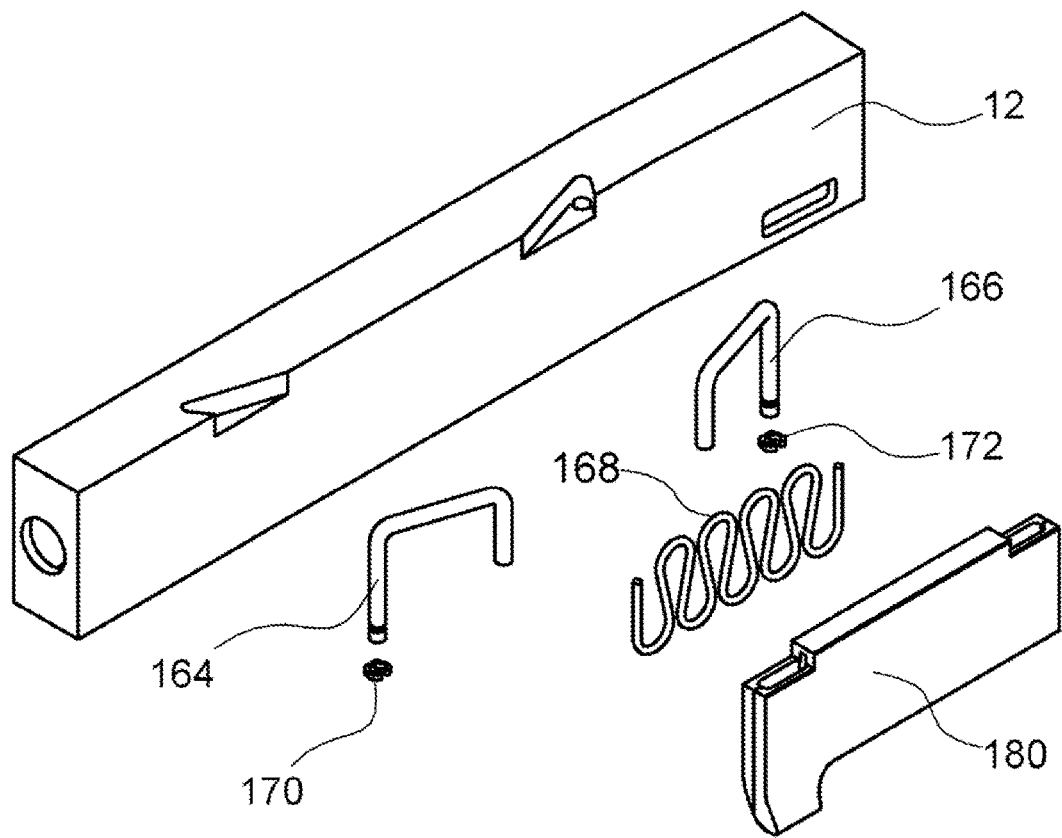
FIG. 12A is an exploded view of another clip arrangement for a wearable device, in accordance with one embodiment.

FIG. 12A illustrates an exploded view 12A-00 of another clip arrangement for a wearable device, in accordance with one embodiment. As an option, the exploded view 12A-00 may be implemented in the context of any one or more of the embodiments set forth in any previous and/or subsequent figure(s) and/or description thereof. Of course, however, the exploded view 12A-00 may be implemented in the context of any desired environment. Further, the aforementioned definitions may equally apply to the description below.

As shown, the clip arrangement for the electronic device comprises a first arm 164, a second arm 166, and a coupler spring 168 that connects the firm arm 164 and the second arm 166. In addition, the firm arm 164 and the second arm 166 are installed in the hinge bearings of the housing 12. Additionally, the firm arm 164 and the second arm 166 are held in place by two retaining rings 170 and 172. Further, the two sides of the spring are installed in the linking sections of the firm arm 164 and the second arm 166, respectively. In one embodiment, the connection between the coupler spring 168 and the first arm 164 and the second arm 166 may not be implemented via their respective angled part(s), but rather via the clip arrangement comprising the case 180, in which the spring and the firm arm 164 and the second arm 166 are connected.

In alternate embodiments of the present description, the retaining rings are only exemplar to hold the firm arm 164 and the second arm 166. Other conventional means such as pinning, riveting, and heading can also be used to retain the firm arm 164 and the second arm 166 in the device housing or in a coupler case.

Figure 12B:
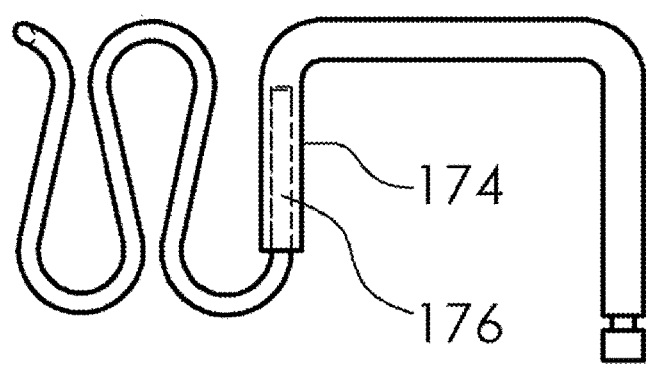
FIG. 12B is a front view showing a coupler spring in connection with one of the arms of the clip arrangement in FIG. 12A, in accordance with one embodiment.

FIG. 12B illustrates a front view 12B-00 showing a coupler spring in connection with one of the arms of the clip arrangement in FIG. 12A, in accordance with one embodiment. As an option, the front view 12B-00 may be implemented in the context of any one or more of the embodiments set forth in any previous and/or subsequent figure(s) and/or description thereof. Of course, however, the front view 12B-00 may be implemented in the context of any desired environment. Further, the aforementioned definitions may equally apply to the description below.

As shown, the linking section 176 of the first arm 164 incorporates a hole 174 as a hinge bearing to host one side section of the coupler spring 168 so that the coupler spring 168 may rotate freely around the hole 174.

Figure 12C:
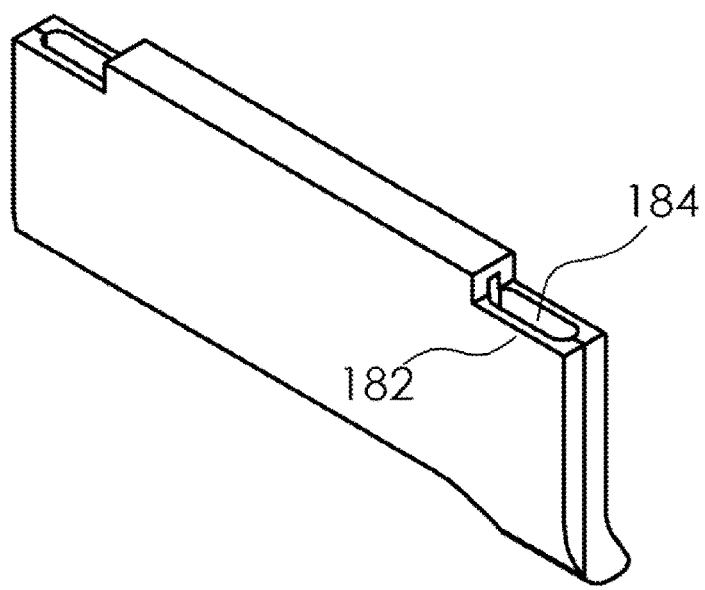
FIG. 12C is a perspective view of a case for the coupler part of the clip arrangement in FIG. 12A, in accordance with one embodiment.

FIG. 12C illustrates a perspective view 12C-00 of a case for the coupler part of the clip arrangement in FIG. 12A, in accordance with one embodiment. As an option, the perspective view 12C-00 may be implemented in the context of any one or more of the embodiments set forth in any previous and/or subsequent figure(s) and/or description thereof. Of course, however, the perspective view 12C-00 may be implemented in the context of any desired environment. Further, the aforementioned definitions may equally apply to the description below.

As shown, the case 180 includes a wall 184 on the top of the empty space 182 that hosts the linking section of the first arm 164.

Figure 12D:
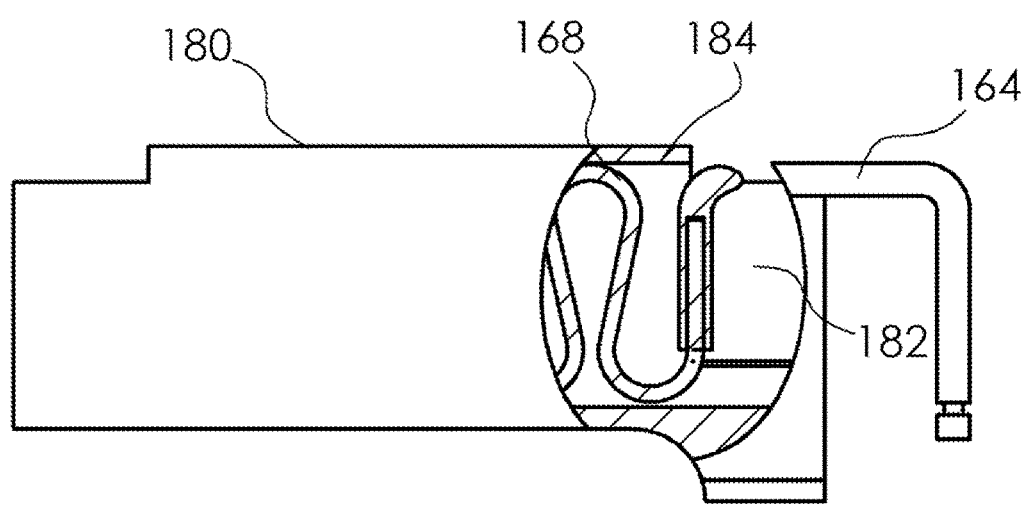
FIG. 12D is a front view of part of the clip arrangement with a broken-out section showing some of its internal structure, in accordance with one embodiment.

FIG. 12D illustrates a front view 12D-00 of part of the clip arrangement with a broken-out section showing some of its internal structure, in accordance with one embodiment. As an option, the front view 12D-00 may be implemented in the context of any one or more of the embodiments set forth in any previous and/or subsequent figure(s) and/or description thereof. Of course, however, the front view 12D-00 may be implemented in the context of any desired environment. Further, the aforementioned definitions may equally apply to the description below.

As shown, coupler spring 168, first arm 164, and the case 180 may be assembled as a single component, allowing coupler spring 168 to rotate freely around the linking section of the first arm 164. In operation, the wall 184 restricts coupler spring 168 within the empty space 182 of the case 180. As such, the coupler spring 168 may not slide away from the hole 174 of the linking section of the first arm 164. Additionally, the second arm 166, the coupler spring 168, and the case 180 may be assembled in a similar manner.

In one embodiment, the arm may be bent to form the lever section and the linking section before its assembly with the coupler spring 168, simplifying the process due to the fact that the hole 174 does not extend to the lever section of the second arm 166.

In another embodiment, the case 180 may be made of flexible materials and a user may unfold or open the case to clean the clip arrangement, replace a damaged case with a new one, or switch to an alternative color or make. Additionally, during this process, a user may replace the coupler spring 168 with a new, replacement, or an alternative coupler spring since it is removably attached to the linking sections of the first arm 164 and the second arm 166. This may be useful if the spring is old, or an alternative spring better fits a specific application to promote, for example, optimal initial bias or elasticity coefficient.

Figure 13A:
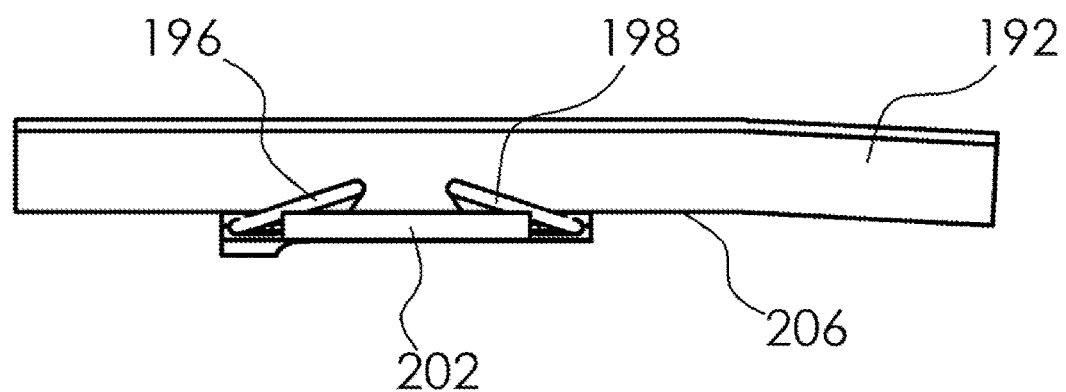
FIG. 13A is a top view of a wearable device comprising another clip arrangement, in accordance with one embodiment.

FIG. 13A illustrates a top view 13A-00 of a wearable device comprising another clip arrangement, in accordance with one embodiment. As an option, the top view 13A-00 may be implemented in the context of any one or more of the embodiments set forth in any previous and/or subsequent figure(s) and/or description thereof. Of course, however, the top view 13A-00 may be implemented in the context of any desired environment. Further, the aforementioned definitions may equally apply to the description below.

As shown, a clip arrangement for a wearable device comprises a first arm 196, a second arm 198, and a compression spring 200 (not shown) that couples the first arm 196 and the second arm 198 housed within a case 202. Additionally, the compression spring 200 pushes the first arm 196 to rotate clock-wise and pushes the second arm 198 to rotate counter-clock-wise so that the linking sections of the first arm 196 and the second arm 198 press against the outer surface 206 of the housing 192. In one embodiment, the compression spring 200 may be designed with an appropriate initial bias force so that once assembled, the clip arrangement exerts pressure on the housing 192, similar in principle to using an extension coupler spring in prior embodiments.

In another embodiment, the first arm 196 and the second arm 198 may be installed into two hinge bearings of a housing 12 with two retaining rings, and the two side sections of the compression spring 200 may each be installed in the holes of the link sections of the first arm 196 and the second arm 198 (e.g., the hole of a link section of the second arm 198). The net result being that the compression spring 200 pushes the first arm 196 and the second arm 198 away from one another instead of pulling them toward one another.

Figure 13B:
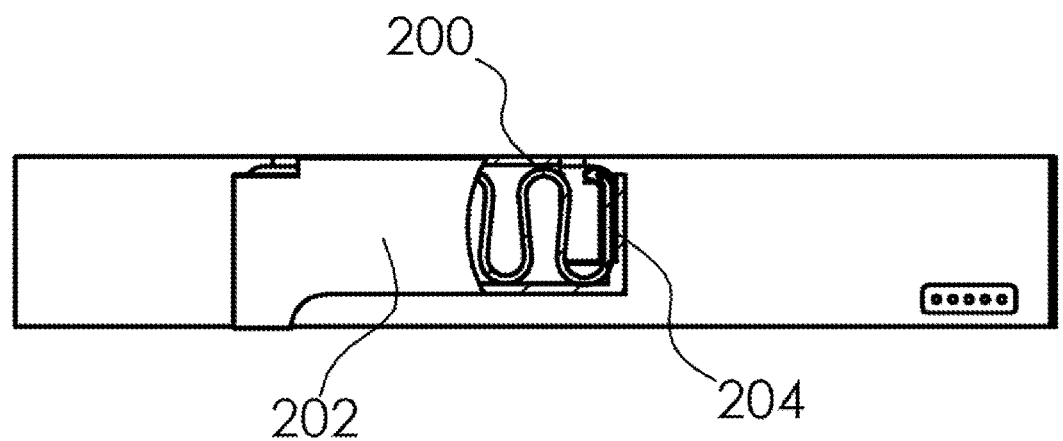
FIG. 13B is a side view of the wearable device in FIG. 13A with a broken-out section showing part of the internal structure of the clip arrangement, in accordance with one embodiment.

FIG. 13B illustrates a side view 13B-00 of the wearable device in FIG. 13A with a broken-out section showing part of the internal structure of the clip arrangement, in accordance with one embodiment. As an option, the side view 13B-00 may be implemented in the context of any one or more of the embodiments set forth in any previous and/or subsequent figure(s) and/or description thereof. Of course, however, the side view 13B-00 may be implemented in the context of any desired environment. Further, the aforementioned definitions may equally apply to the description below.

As shown, the compression spring 200 is installed inside the hole of the linking section through the end of the lever section near the linking section of the second arm 198. In one embodiment, the compression spring 200 and the second arm 198 may be locked together via bending. In an alternative embodiment, the clip arrangement may also comprise a case 202 to promote increased rigidity of the coupler part and protection for the target object onto which it may clip.

In another embodiment, the case 202 may incorporate a wall above the two empty spaces that host the linking sections of the first arm 196 and the second arm 198. In an alternative embodiment, the case 202 may not incorporate a wall (as in FIG. 9 and FIG. 10) because the compression spring 200 and the second arm 198 are already locked together via their bending along the hole within the linking and the lever sections of the first arm 196 and the second arm 198.

In yet another embodiment, the compression spring 200 and the linking section of the second arm 198 may also be locked together by enveloping the components in a case (like that shown in FIG. 12C). In such an example, a top wall may cover the otherwise empty space where the linking section of the second arm 198 restricts the compression spring 200 inside the straight hole of the linking section of the arm.

Figure 13C:
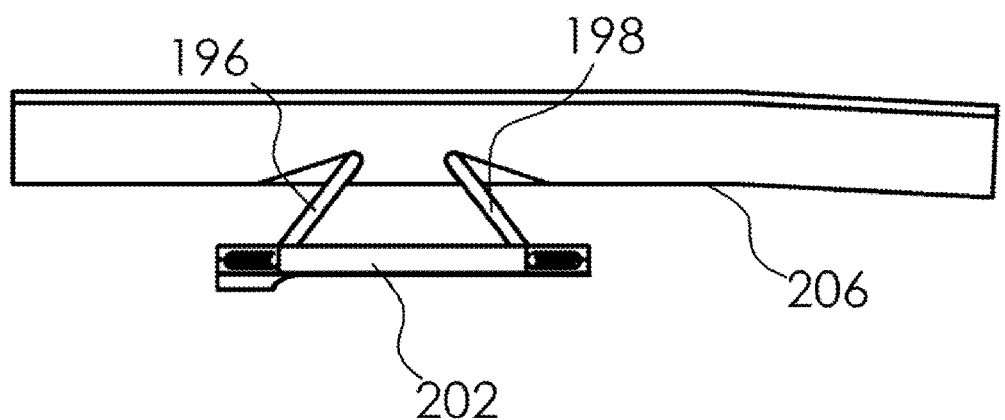
FIG. 13C is a top view of the wearable device in FIG. 13A where the clip arrangement is in an open state, in accordance with one embodiment.

FIG. 13C illustrates a top view 13C-00 of the wearable device in FIG. 13A where the clip arrangement is in an open state, in accordance with one embodiment. As an option, the top view 13C-00 may be implemented in the context of any one or more of the embodiments set forth in any previous and/or subsequent figure(s) and/or description thereof. Of course, however, the top view 13C-00 may be implemented in the context of any desired environment. Further, the aforementioned definitions may equally apply to the description below.

As shown, the first arm 196 and the second arm 198 are pulled closer to one another and the compression spring 200 (not shown) is compressed within case 202. Additionally, it should be noted that the net effect of the operation in this instance is that the coupler part comprising case 202 is pulled away from the outer surface 206 of the housing 192.

Figure 13D:
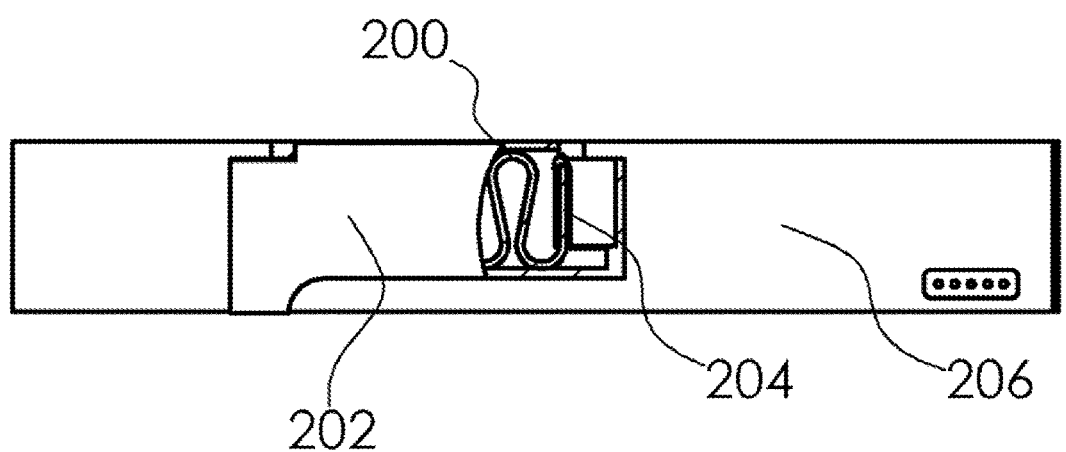
FIG. 13D is a side view of the wearable device in FIG. 13A with the same broken-out section as in FIG. 13B showing the internal structure of the clip arrangement where it is in the open state as in FIG. 13C, in accordance with one embodiment.

FIG. 13D illustrates a side view 13D-00 of the wearable device in FIG. 13A with the same broken-out section as in FIG. 13B showing the internal structure of the clip arrangement where it is in the open state as in FIG. 13C, in accordance with one embodiment. As an option, the side view 13D-00 may be implemented in the context of any one or more of the embodiments set forth in any previous and/or subsequent figure(s) and/or description thereof. Of course, however, the side view 13D-00 may be implemented in the context of any desired environment. Further, the aforementioned definitions may equally apply to the description below.

As shown, the compression spring 200 is installed inside the hole of the linking section through the end of the lever section near the linking section of the second arm 198. In one embodiment, compression spring 200 may be compressed when installed into case 202 so that compression spring 200 imposes pressure upon the first arm 196 and the second arm 198 to effectively push them apart. As the result, the linking sections of the first arm 196 and the second arm 198 and the coupler part press the target object firmly onto the outer surface 206 of the housing 192.

Figure 14A:
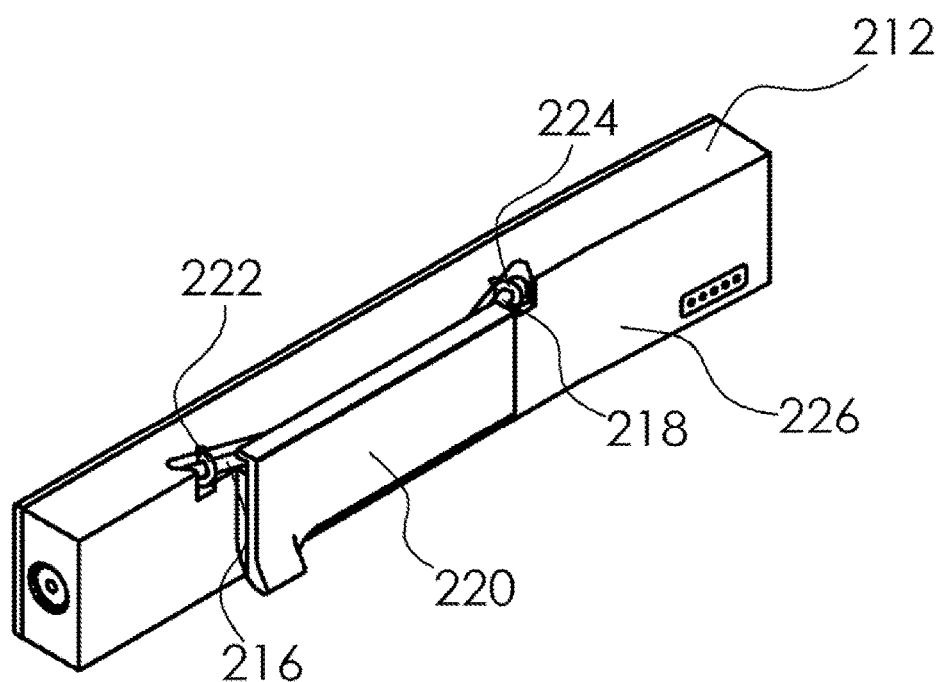
FIG. 14A is a perspective view of a wearable device comprising another clip arrangement, in accordance with one embodiment.

FIG. 14A illustrates a perspective view 14A-00 of a wearable device comprising another clip arrangement, in accordance with one embodiment. As an option, the perspective view 14A-00 may be implemented in the context of any one or more of the embodiments set forth in any previous and/or subsequent figure(s) and/or description thereof. Of course, however, the perspective view 14A-00 may be implemented in the context of any desired environment. Further, the aforementioned definitions may equally apply to the description below.

As shown, a clip arrangement of the wearable device may comprise a first arm 216 and a second arm 218 respectively hinged to housing 212, and a coupler part 220 that connects to the first arm 216 and the second arm 218. In addition, the clip arrangement comprises a first torsion spring 222 installed on the first arm 216 and a second torsion spring 224 installed on the second arm 218.

Figure 14B:
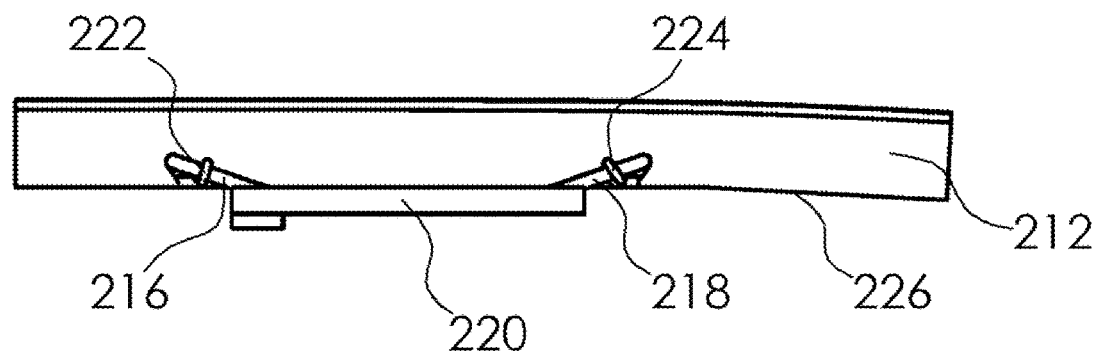
FIG. 14B is a top view of the wearable device in FIG. 14A where the clip arrangement is in a closed state, in accordance with one embodiment.

FIG. 14B illustrates a top view 14B-00 of the wearable device in FIG. 14A where the clip arrangement is in a closed state, in accordance with one embodiment. As an option, the top view 14B-00 may be implemented in the context of any one or more of the embodiments set forth in any previous and/or subsequent figure(s) and/or description thereof. Of course, however, the top view 14B-00 may be implemented in the context of any desired environment. Further, the aforementioned definitions may equally apply to the description below.

As shown, a clip arrangement of the wearable device in closed state comprises a first arm 216 and a second arm 218 respectively hinged to housing 212, and a coupler part 220 that connects to the first arm 216 and the second arm 218. In addition, the clip arrangement comprises a first torsion spring 222 installed on the first arm 216 and a second torsion spring 224 installed on the second arm 218.

In one embodiment, torque provided by the first torsion spring 222 forces the first arm 216 to turn along the corresponding hinge counter-clockwise, whereas torque provided by the second torsion spring 224 forces the second arm 218 to turn along the corresponding hinge clockwise, resulting in the linking sections of the first arm 216 and the second arm 218 pressing the coupler part 220 tightly against the outer surface 226 of the housing 212.

In another embodiment, the first torsion spring 222 and the second torsion spring 224 may be designed with appropriate initial bias force so that the clip arrangement may press against the housing 212 with adequate force to ensure maximized contact.

Figure 14C:
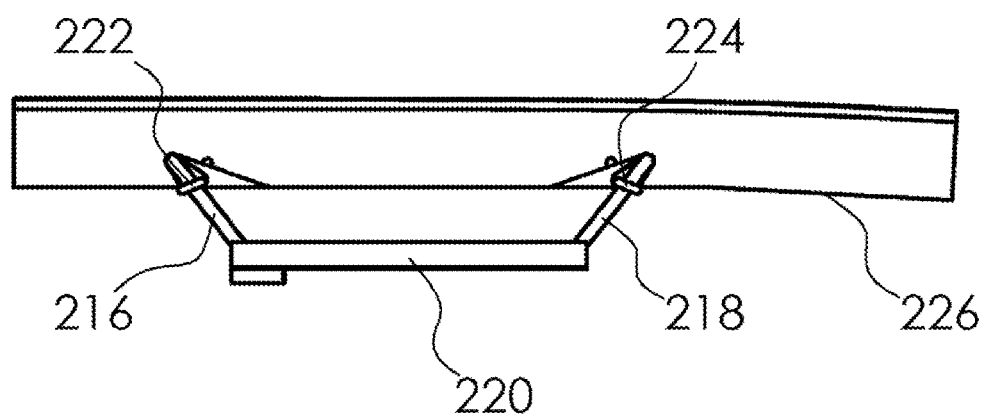
FIG. 14C is a top view of the wearable device in FIG. 14A where the clip arrangement is in an open state, in accordance with one embodiment.

FIG. 14C illustrates a top view 14C-00 of the wearable device in FIG. 14A where the clip arrangement is in an open state, in accordance with one embodiment. As an option, the top view 14C-00 may be implemented in the context of any one or more of the embodiments set forth in any previous and/or subsequent figure(s) and/or description thereof. Of course, however, the top view 14C-00 may be implemented in the context of any desired environment. Further, the aforementioned definitions may equally apply to the description below.

As shown, a clip arrangement of the wearable device in open state comprises a first arm 216 and a second arm 218 respectively hinged to housing 212, and a coupler part 220 that connects to the first arm 216 and the second arm 218. In addition, the clip arrangement comprises a first torsion spring 222 installed on the first arm 216 and a second torsion spring 224 installed on the second arm 218. In one embodiment, the first arm 216 and the second arm 218 rotate away from one another such that the first torsion spring 222 and the second torsion spring 224 are each turned or compressed further apart. Thus, the two torsion springs exert increased torque on the first arm 216 and the second arm 218 to which each is connected, resulting in the linking sections of the first arm 216 and the second arm 218 and the coupler part 220 pressing the target object against outer surface 226 more tightly.

Figure 15A:
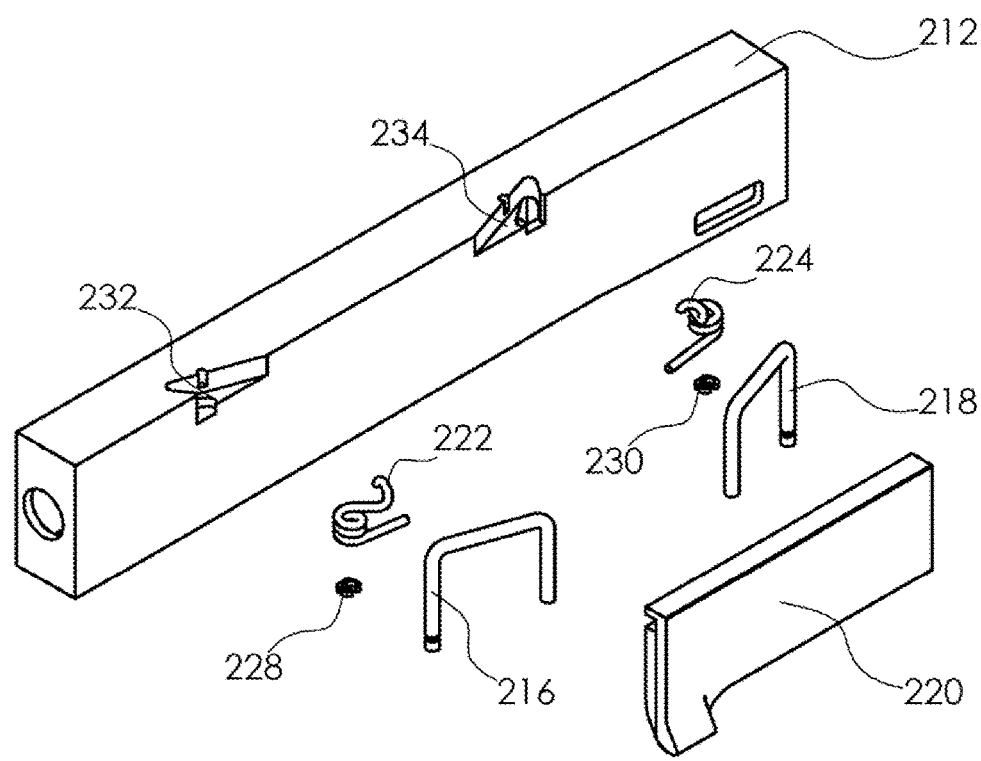
FIG. 15A is an exploded view of a clip arrangement with torsion springs for a wearable device, in accordance with one embodiment.

FIG. 15A illustrates an exploded view 15A-00 of a clip arrangement with torsion springs for a wearable device, in accordance with one embodiment. As an option, the exploded view 15A-00 may be implemented in the context of any one or more of the embodiments set forth in any previous and/or subsequent figure(s) and/or description thereof. Of course, however, the exploded view 15A-00 may be implemented in the context of any desired environment. Further, the aforementioned definitions may equally apply to the description below.

As shown, the clip arrangement comprises a first arm 216, a second arm 218, a first torsion spring 222 and a second torsion spring 224, and first retaining ring 228 and the second retaining ring 230. In addition, a first hinge bearing 232 and a second hinge bearing 234 provide for installation of the first arm 216 and the second arm 218, which ultimately connect to coupler part 220.

In one embodiment, there may be an empty space on either side of the coupler part 220 designed to host the linking section of the corresponding arm similar to the case 180 described earlier (see FIG. 15B for detailed view). In a related embodiment, there may be a wall above the empty space on either side of the case 180, restricting the linking section of the respective arm within the empty space of the case, wherein the linking section is installed and allowed to move in the empty space (see, again, FIG. 15B for detailed view).

Figure 15B:
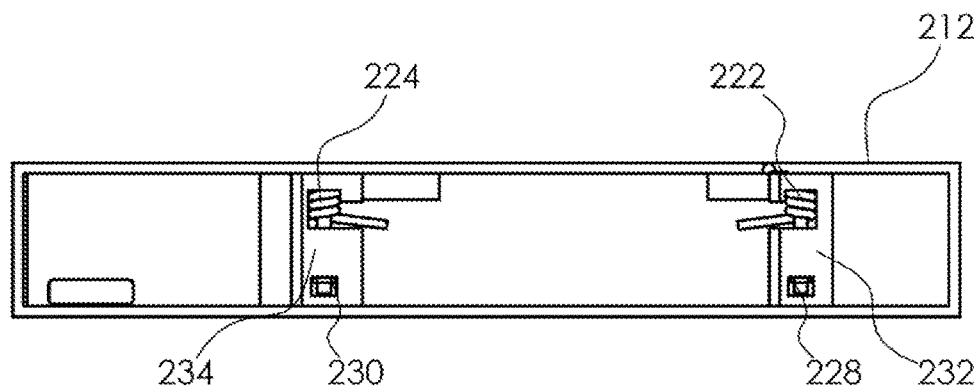
FIG. 15B is a front view of the housing of the wearable device in FIG. 15A from one side of the housing, in accordance with one embodiment.

FIG. 15B illustrates a front view 15B-00 of the housing of the wearable device in FIG. 15A from one side of the housing, in accordance with one embodiment. As an option, the front view 15B-00 may be implemented in the context of any one or more of the embodiments set forth in any previous and/or subsequent figure(s) and/or description thereof. Of course, however, the front view 15B-00 may be implemented in the context of any desired environment. Further, the aforementioned definitions may equally apply to the description below.

As shown, the first retaining ring 228 locks the first arm 216 in the first hinge bearing 232 and the first torsion spring 222 is installed on the attachment section of the first arm 216, where it is restricted in a recess of the hinge bearing. In addition, the second retaining ring 230 locks the second arm 218 in the second hinge bearing 234 and the second torsion spring 224 is installed on the attachment section of the second arm 218, where it is restricted in a recess of the hinge bearing.

Figure 16A:
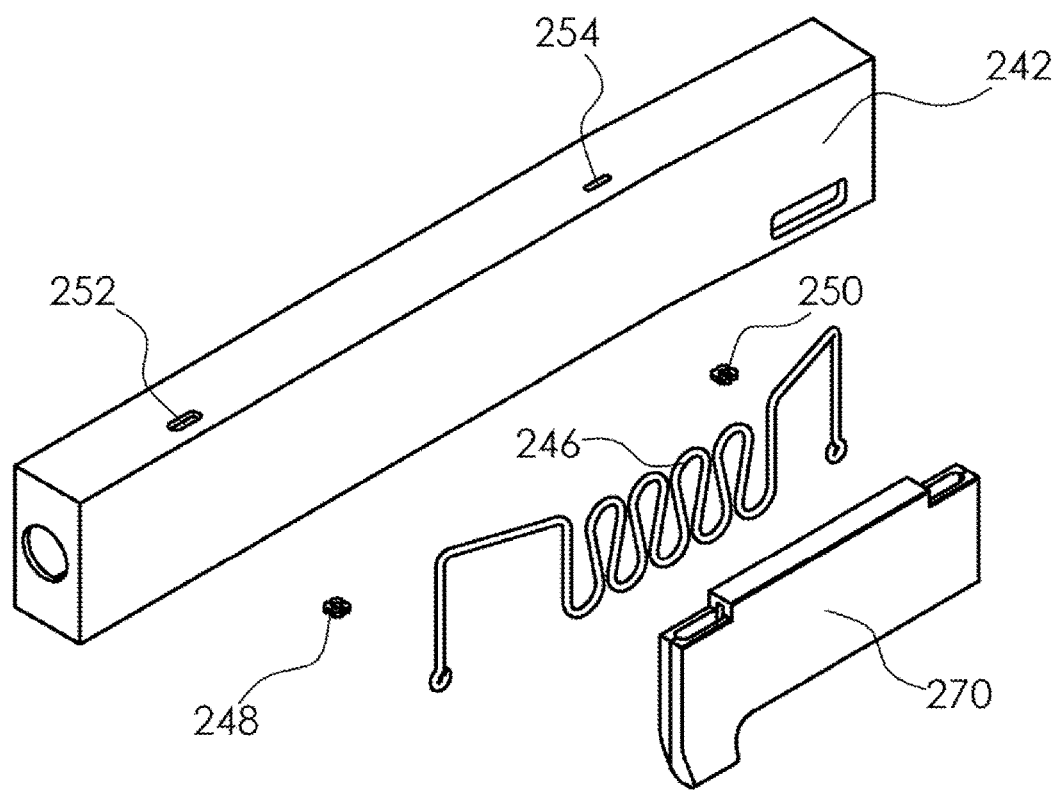
FIG. 16A is an exploded view of another clip arrangement with an integrated component for a wearable device, in accordance with one embodiment.

FIG. 16A illustrates an exploded view 16A-00 of another clip arrangement with an integrated component for a wearable device, in accordance with one embodiment. As an option, the exploded view 16A-00 may be implemented in the context of any one or more of the embodiments set forth in any previous and/or subsequent figure(s) and/or description thereof. Of course, however, the exploded view 16A-00 may be implemented in the context of any desired environment. Further, the aforementioned definitions may equally apply to the description below.

As shown, a clip arrangement comprises an integrated component 246 to which two retaining rings 248 and 250 are attached. In addition, the clip arrangement is also enveloped within case 270. Additionally, the clip arrangement serves as a (single) integrated component 246, wherein the two arms are connected with the housing 242, with a spring linking the two arms.

In one embodiment, the integrated component 246 may be constructed of a steel wire with a U-shaped arm on either side of a serpentine spring. Additionally, a loop may be formed at either end of the integrated component 246 to help retain the component in the hinge bearings of the housing 242. In addition, on top side of the housing 242, there are a first flat opening 252 and a second flat opening 254, into which both sides of the integrated component 246 may be installed in the housing 242.

Figure 16B:
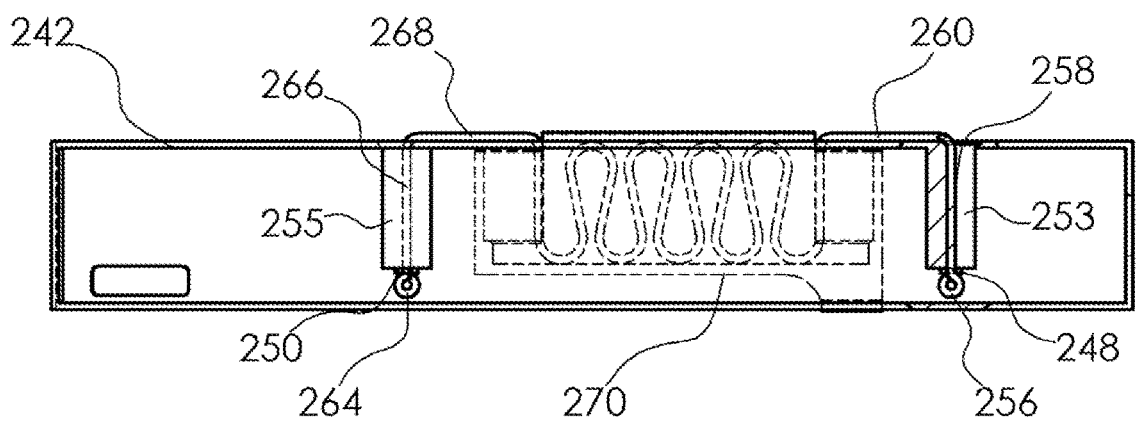
FIG. 16B is a front view of the clip arrangement in FIG. 16A with visible hidden lines and broken-out sections showing its internal configuration, in accordance with one embodiment.

FIG. 16B illustrates a front view 16B-00 of the clip arrangement in FIG. 16A with visible hidden lines and broken-out sections showing its internal configuration, in accordance with one embodiment. As an option, the front view 16B-00 may be implemented in the context of any one or more of the embodiments set forth in any previous and/or subsequent figure(s) and/or description thereof. Of course, however, the front view 16B-00 may be implemented in the context of any desired environment. Further, the aforementioned definitions may equally apply to the description below.

As shown a first vertical groove 253 is positioned on the right side of the first hinge bearing of the housing 242. The width of the groove corresponds to that of the first flat opening 252 so that a first end loop 256 at one end of the integrated component 246 and a first attachment section 258 may be inserted through its respective hinge bearing. In addition, a retaining ring 248 may be used to secure the first end loop 256 at the bottom of the first hinge bearing. In addition, there is a second vertical groove 255 on the left side of the second hinge bearing of the housing 242. The width of the groove corresponds to that of the second flat opening 254 so that a second end loop 264 at the other end of the integrated component 246 and a second attachment section 266 may be inserted through its respective hinge bearing. Additionally, a retaining ring 250 may be used to secure the second end loop 264 at the bottom of the second hinge bearing. Further, the first attachment section 258 and the second attachment section 266 of the component are hinged to the housing 242 in the first vertical groove 253 and the second vertical groove 255, respectively due to the restriction by the spring sections 260 and 268 of the integrated component 246.

In one embodiment, spring sections 260 and 268 of the integrated component 246 may be designed with appropriate initial bias so that the assembled clip arrangement exerts adequate force against the housing 242 to ensure desired contact. It should be noted that the role of the spring sections 260 and 268 in the integrated component 246 of the clip arrangement is similar to that of serpentine extension spring 26 addressed in FIGS. 1B, 1C, and 1E. It is also worth noting that the linking sections of the two spring sections 260 and 268 of the integrated component 246 may receive significant torsion during operation of the clip arrangement. In order to ensure these sections do not yield to the torsion or fail due to undue stress during clip arrangement operation, the integrated component 246 may be made of a strong material like spring wire employed in musical instruments.

In another embodiment, the first vertical groove 253 and/or the second vertical groove 255 in the hinge bearing may be oriented such that, once installed, the first end loop 256 and the second end loop 264 of the integrated component 246 may not decouple from the first vertical groove 253 and/or the second vertical groove 255 during clip arrangement operation, in which case, retaining rings 248 and 250 would not be needed.

In yet another embodiment, a user may install the end loops through their respective grooves (e.g. the first vertical groove 253 and/or the second vertical groove 255) of the hinge bearings by slightly bending the integrated component to overcome its initial bias so that its two end loops align with the respective first flat opening 252 and/or second flat opening 254 of the first vertical groove 253 and/or the second vertical groove 255.

In a further embodiment, a user may detach the integrated component 246 from the housing by, for example, slightly turning the two lever sections to align its end loops with the hinge grooves (e.g. the first vertical groove 253 and/or the second vertical groove 255). In the instance of a clip arrangement where the case 180 and the coupler spring 168 may be detached and replaced (see FIGS. 12A-12D), the present clip arrangement receives benefits similar to the above integrated component 246 (which may be detachable).

Figure 17A:
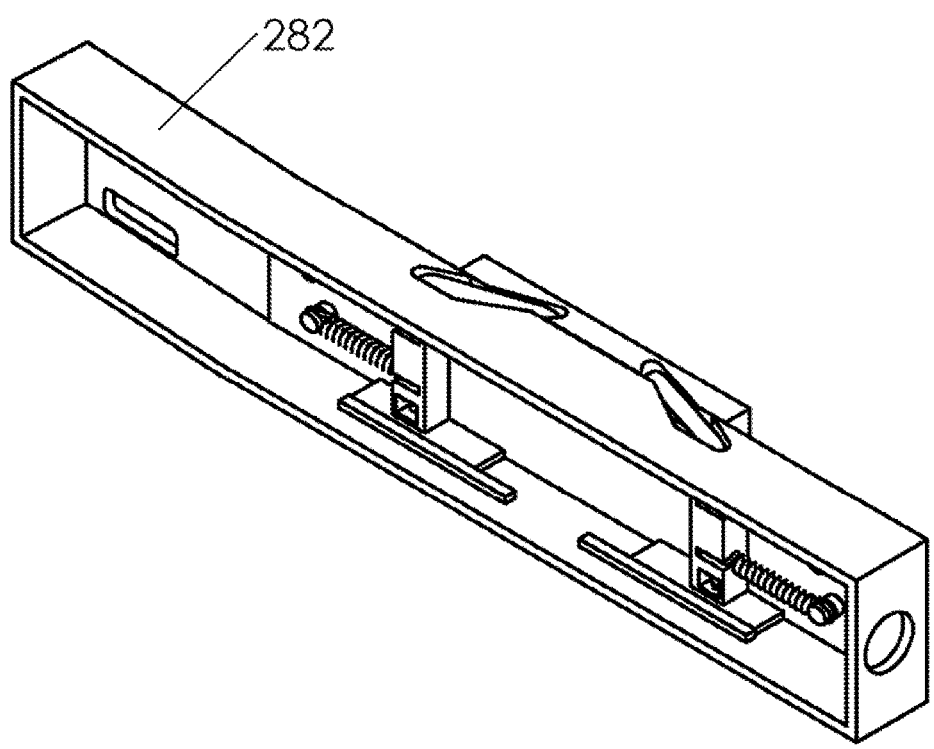
FIG. 17A is a perspective view of another clip arrangement comprising movable hinge bearings for a wearable device, in accordance with one embodiment.

FIG. 17A illustrates a perspective view 17A-00 of another clip arrangement comprising movable hinge bearings for a wearable device, in accordance with one embodiment. As an option, the perspective view 17A-00 may be implemented in the context of any one or more of the embodiments set forth in any previous and/or subsequent figure(s) and/or description thereof. Of course, however, the perspective view 17A-00 may be implemented in the context of any desired environment. Further, the aforementioned definitions may equally apply to the description below.

As shown, the arms of the clip arrangement are attached to the housing 282 of the wearable device by movable hinges.

Figure 17B:
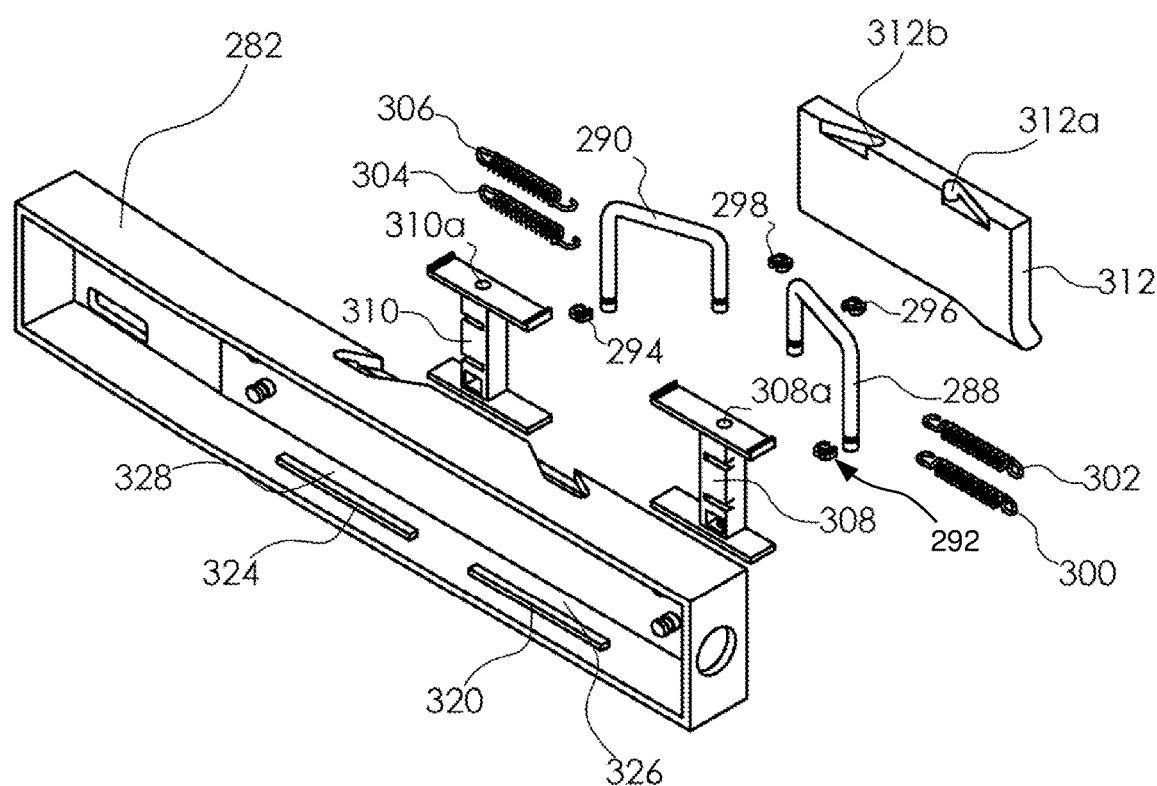
FIG. 17B is an exploded view of the clip arrangement in FIG. 17A, in accordance with one embodiment.

FIG. 17B illustrates an exploded view 17B-00 of the clip arrangement in FIG. 17A, in accordance with one embodiment. As an option, the exploded view 17B-00 may be implemented in the context of any one or more of the embodiments set forth in any previous and/or subsequent figure(s) and/or description thereof. Of course, however, the exploded view 17B-00 may be implemented in the context of any desired environment. Further, the aforementioned definitions may equally apply to the description below.

As shown, a first sliding hinge bearing 308 and a second sliding hinge bearing 310, are designed to be installed within housing 282 in contact with chutes 328 and 326, respectively. In addition, a first arm 288, a second arm 290 may be installed into first sliding hinge bearing 308 and second sliding hinge bearing 310 via hinge hole 308a and hinge hole 310a, respectively, and secured in place via retaining rings 292 and 294, respectively. Additionally, extension springs 300, 302, 304 and 306 may connect first sliding hinge bearing 308 in its chute 326 and second sliding hinge bearing 310 in its chute 328 to housing 282 (for additional detailed illustration, see FIG. 17C). Further, first arm 288 and second arm 290 may be installed at their other ends into first hinge bearing 312a and second hinge bearing 312b of the coupling case 312 and seared in place using retaining rings 296 and 298.

Figure 17C:
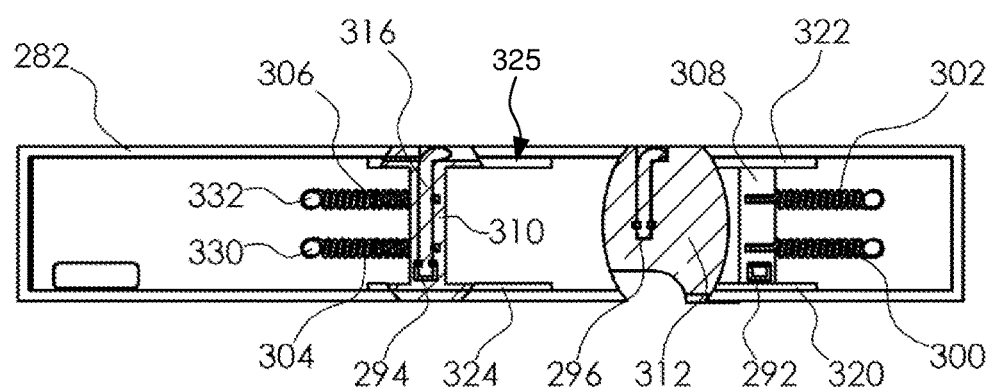
FIG. 17C is a front view of the clip arrangement in FIG. 17A with broken-out sections showing the internal structure of the arrangement, in accordance with one embodiment.

FIG. 17C illustrates a front view 17C-00 of the clip arrangement in FIG. 17A with broken-out sections showing the internal structure of the arrangement, in accordance with one embodiment. As an option, the front view 17C-00 may be implemented in the context of any one or more of the embodiments set forth in any previous and/or subsequent figure(s) and/or description thereof. Of course, however, the front view 17C-00 may be implemented in the context of any desired environment. Further, the aforementioned definitions may equally apply to the description below. As shown, one end of each of the extension springs 304 and 306 may be fastened to the spring holders 330 and 332 on the wall of housing 282, with their other ends are affixed to the attachment section 316 of the second arm 290 via the openings on the second sliding hinge bearing 310. Additionally, as shown in the figure, the two ends of the extension springs 300 and 302 may be affixed to the corresponding spring holders on the wall of the housing 282 and the attachment section of the first arm 288.

In one embodiment, chute 326 may be formed by a first protrusion 320 and the wall of housing 282. In addition, the upper sliding plate of the first sliding hinge bearing 308 may be located in chute 326 at the upper part of the housing 282 formed by a second protrusion 322 and the wall of housing 282. In like embodiment, the lower sliding plate of the second sliding hinge bearing 310 may be located in chute 328 at the bottom of the housing 282 formed by a third protrusion 324 and the wall of the housing 282 with its upper sliding plate located in the chute at the upper part of the housing formed by protrusion 325 and the wall of the housing 282.

In another embodiment, the clip arrangement may have a suitable initial bias so that it has the predefined clamping force within its actual working range. Specifically, the initial bias may be realized by the design of extension springs 300, 302, 304 and 306, according to the sizes of the first and second arms, initial angles in relation to the housing surface, and the thickness of the object on which they are to be clipped.

Figure 17D:
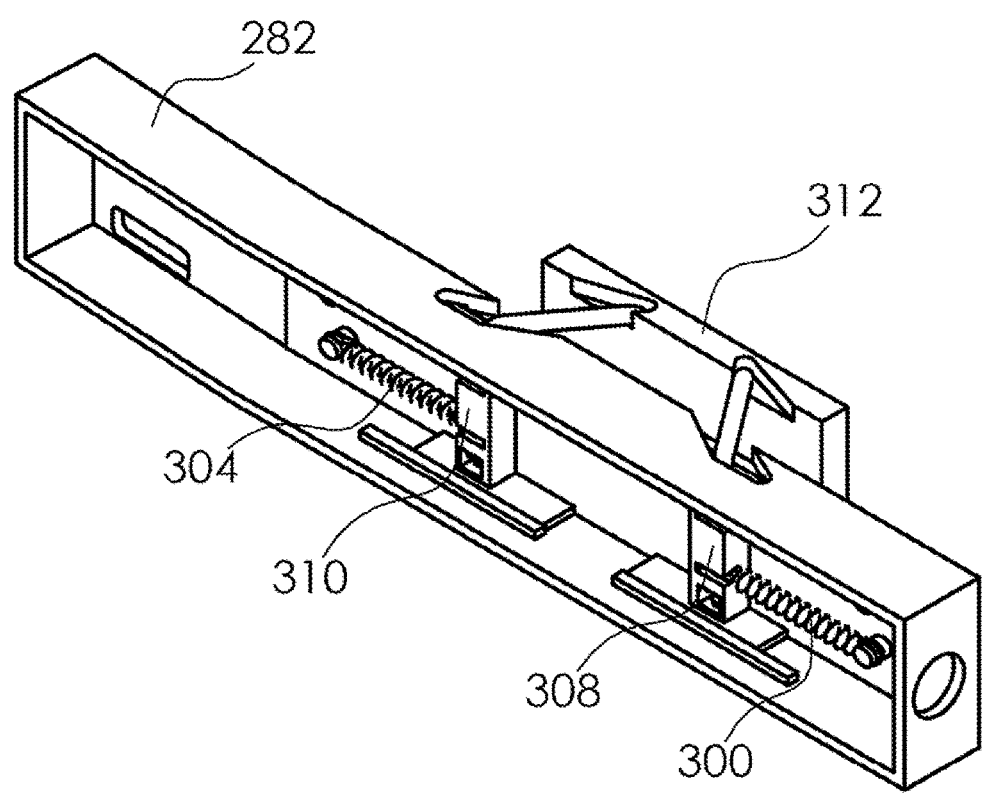
FIG. 17D is a perspective view of the clip arrangement in FIG. 17A where the clip arrangement is in an open state, in accordance with one embodiment.

FIG. 17D illustrates a perspective view 17D-00 of the clip arrangement in FIG. 17A where the clip arrangement is in an open state, in accordance with one embodiment. As an option, the perspective view 17D-00 may be implemented in the context of any one or more of the embodiments set forth in any previous and/or subsequent figure(s) and/or description thereof. Of course, however, the perspective view 17D-00 may be implemented in the context of any desired environment. Further, the aforementioned definitions may equally apply to the description below.

As shown, the coupling case 312 may be separated from the housing 282, thus illustrating a clip arrangement in an open state, where the angle between the lever sections of the first arm 288 and the second arm 290 becomes smaller and the first sliding hinge bearing 308 and the second sliding hinge bearing 310 move closer to one another. Additionally, in an open state of operation, the extension springs 300, 302 (obscured from view in the present Figure), 304 and 306 (occluded) are stretched/extended, exerting increased force that pulls the coupling case 312 toward the housing 282, thus causing a target object in between them to be gripped tight.

Figure 18A:
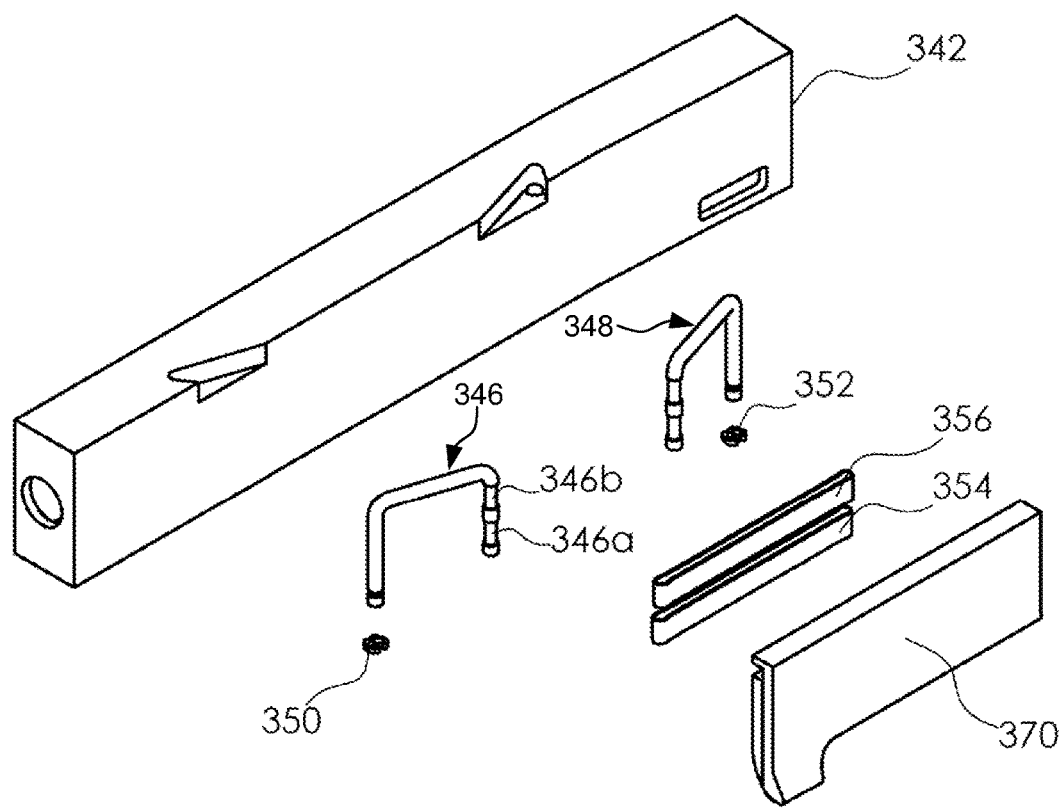
FIG. 18A is an exploded view of another clip arrangement comprising elastic bands for a wearable device, in accordance with one embodiment.

FIG. 18A illustrates an exploded view 18A-00 of another clip arrangement comprising elastic bands for a wearable device, in accordance with one embodiment. As an option, the exploded view 18A-00 may be implemented in the context of any one or more of the embodiments set forth in any previous and/or subsequent figure(s) and/or description thereof. Of course, however, the exploded view 18A-00 may be implemented in the context of any desired environment. Further, the aforementioned definitions may equally apply to the description below.

As shown, a clip arrangement includes a first arm 346, a second arm 348, retaining rings 350 and 352, elastic bands 354 and 356, and a housing 342 with corresponding hinge bearing openings. Additionally, the linking sections of the arms each have one or more grooves (shown as items 346*a* and 346*b*) to prevent the elastic bands 354 and 356 from shifting along, or possibly sliding off of, the linking sections. In addition, the clip arrangement may further comprise a case 370 to house the elastic bands. In one embodiment, the elastic bands may be made of rubber, latex, elastic fabric, and/or any other flexible material or structure with suitable elasticity.

In another embodiment, the structure of the clip arrangement may be similar to that of prior clip arrangement implementations (see, for example, FIGS. 1-2, 5-6, and 9-10), where the two arms of the clip arrangement are coupled by at least one elastic band to provide the internal tension of the clip arrangement.

Figure 18B:
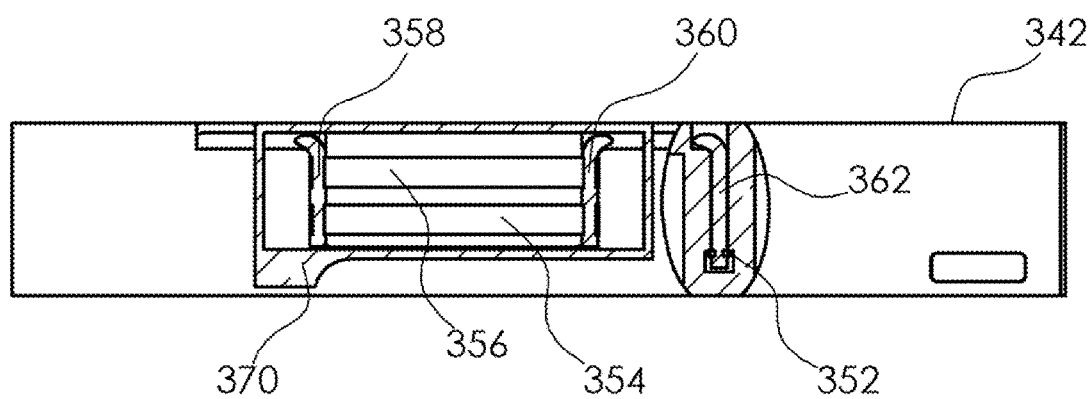
FIG. 18B is a front view of the clip arrangement in FIG. 18A with broken-out sections showing the internal structure of the arrangement, in accordance with one embodiment.

FIG. 18B illustrates a front view 18B-00 of the clip arrangement in FIG. 18A with broken-out sections showing the internal structure of the arrangement, in accordance with one embodiment. As an option, the front view 18B-00 may be implemented in the context of any one or more of the embodiments set forth in any previous and/or subsequent figure(s) and/or description thereof. Of course, however, the front view 18B-00 may be implemented in the context of any desired environment. Further, the aforementioned definitions may equally apply to the description below.

As shown, elastic bands 354 and 356 are fastened to the linking sections 358 and 360 of the first arm 346 and second arm 348 inside case 370. Additionally, the attachment section 362 of the first arm 346 is installed in the corresponding hinge bearing of the housing 342 and locked by retaining ring 352. In one embodiment, the clip arrangement may have a predefined gripping force for its actual working range through the design of the elastic bands, including selected material(s) and size(s).

In another embodiment, a clip arrangement may be the same as the clip arrangement described above except that the elastic bands may be replaced by coil springs to connect the two arms. In still another embodiment, the clip arrangement may employ incorporate multiple fine coil springs (possibly constructed of spring wires used in musical instruments, for example), which may help lower the profile of the clip arrangement while increasing the strength and durability of the spring.

Figure 19A:
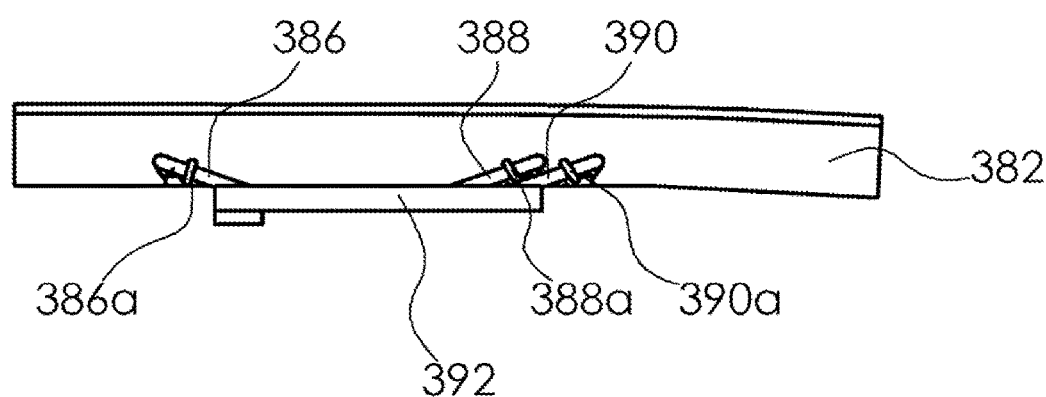
FIG. 19A is a top view of a wearable device comprising a clip arrangement with three arms, in accordance with one embodiment.

FIG. 19A illustrates a top view 19A-00 of a wearable device comprising a clip arrangement with three arms, in accordance with one embodiment. As an option, the top view 19A-00 may be implemented in the context of any one or more of the embodiments set forth in any previous and/or subsequent figure(s) and/or description thereof. Of course, however, the top view 19A-00 may be implemented in the context of any desired environment. Further, the aforementioned definitions may equally apply to the description below.

As shown, a clip arrangement comprises a first arm 386, a second arm 388, and a third arm 390, where the first arm 386 is on the left side and the second arm 388 and the third arm 390 are on the right side. In addition, the structure of each of the first arm 386, the second arm 388, and the third arm 390 is hinged to the housing 382 and connected to the coupler case 392 in a similar to the clip arrangements presented in FIGS. 14A-14C and 15A-15B. Additionally, first arm 386, second arm 388, and third arm 390 make use of torsion springs 386*a*, 388*a*, and 390*a* installed on the first arm 386, the second arm 388, and the third arm 390, respectively.

In one embodiment, a clip arrangement may have three or more arms working together.

Figure 19B:
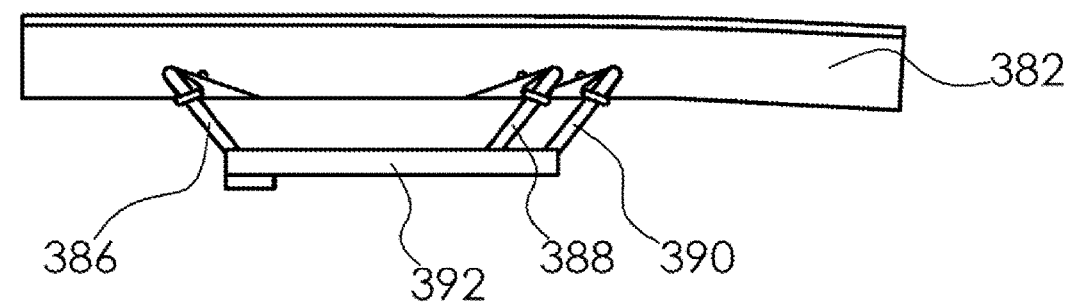
FIG. 19B is a top view of the wearable device in FIG. 19A where the clip arrangement is in an open state, in accordance with one embodiment.

FIG. 19B illustrates a top view 19B-00 of the wearable device in FIG. 19A where the clip arrangement is in an open state, in accordance with one embodiment. As an option, the top view 19B-00 may be implemented in the context of any one or more of the embodiments set forth in any previous and/or subsequent figure(s) and/or description thereof. Of course, however, the top view 19B-00 may be implemented in the context of any desired environment. Further, the aforementioned definitions may equally apply to the description below.

As shown, a clip arrangement comprises a first arm 386, a second arm 388, and a third arm 390, where the first arm 386 is on the left side and the second arm 388 and the third arm 390 are on the right side in an open state.

In one embodiment, ignoring the lateral friction between the target object to which the wearable device may be clipped and the outer surfaces of the coupler case 392 and housing 382, the torque provided by the first arm 386 to the coupler case 392 equals the sum of the torque applied by the second arm 388 and the third arm 390 to coupler case 392 because the second arm 388 and the third arm 390 may be attached to the same side of coupler case 392. It should therefore be noted that using a structure with multiple arms on the same side reduces the internal stress of the arms, which in turn reduces the tension in the corresponding torsion springs.

Figure 20A:
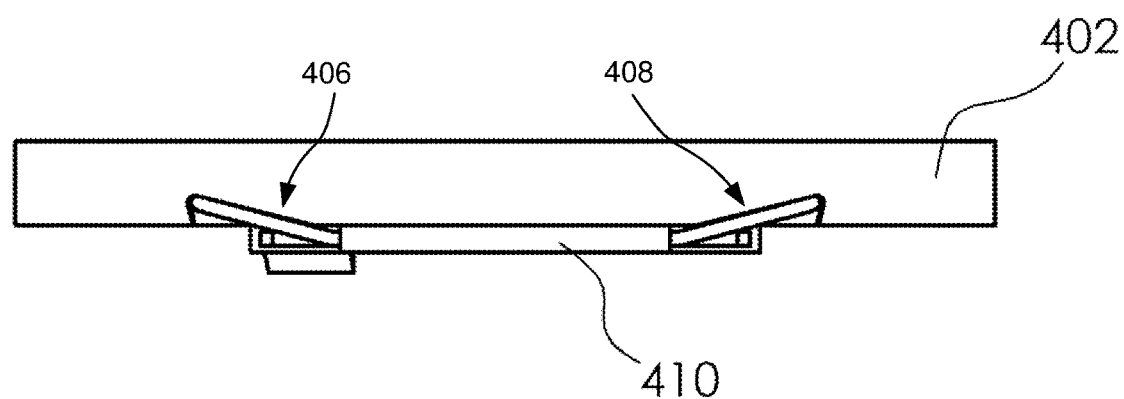
FIG. 20A is a top view of a wearable device round overall shape comprising a clip arrangement that is accordingly shaped, in accordance with one embodiment.

FIG. 20A illustrates a top view 20A-00 of a wearable device round overall shape comprising a clip arrangement that is accordingly shaped, in accordance with one embodiment. As an option, the top view 20A-00 may be implemented in the context of any one or more of the embodiments set forth in any previous and/or subsequent figure(s) and/or description thereof. Of course, however, the top view 20A-00 may be implemented in the context of any desired environment. Further, the aforementioned definitions may equally apply to the description below.

As shown, a clip arrangement comprising coupler case 410 is attached to a device housing 402. In one embodiment, said clip arrangement may incorporate a similar clip structure similar in construction to any of the foregoing embodiments in the present description, while its overall shape may be adapted to that of a variety of target objects.

Figure 20B:
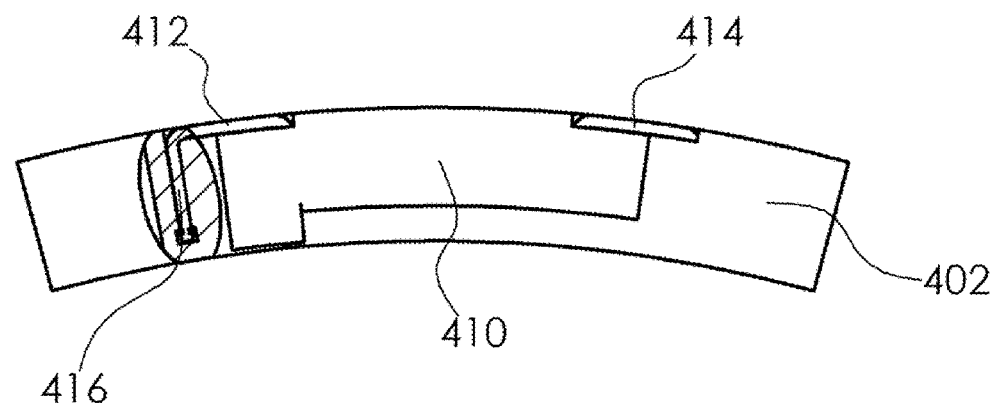
FIG. 20B is a front view of the wearable device with broken-out section showing the internal configuration of the clip arrangement, in accordance with one embodiment.

FIG. 20B illustrates a front view 20B-00 of the wearable device with broken-out section showing the internal configuration of the clip arrangement, in accordance with one embodiment. As an option, the front view 20B-00 may be implemented in the context of any one or more of the embodiments set forth in any previous and/or subsequent figure(s) and/or description thereof. Of course, however, the front view 20B-00 may be implemented in the context of any desired environment. Further, the aforementioned definitions may equally apply to the description below.

As shown, a device housing 402 may be curved as if one of the aforementioned rectangular housings (such as the housing 12) were visibly bent. Accordingly, the lever sections 412 and 414 of the first arm 406 and the second arm 408, respectively, and the coupler case 410 may also be curved in similar fashion. Additionally, the attachment section 416 of the first arm 406 may be installed in a hinge bearing flush with the top of the device housing 402 and the second arm 408 may be likewise installed.

In one embodiment, a device with a curved clip arrangement may better clip onto similarly curved objects such as brims of hats or helmets in varying thickness. It should be noted that, if the housing surface is to be attached to a curved object surface, the attachment sections of the arms of the clip arrangement and the respective hinge bearings of the housing may be similarly curved, and the linking sections of the arms may move in a similar manner as the arms rotate.

Figure 21:
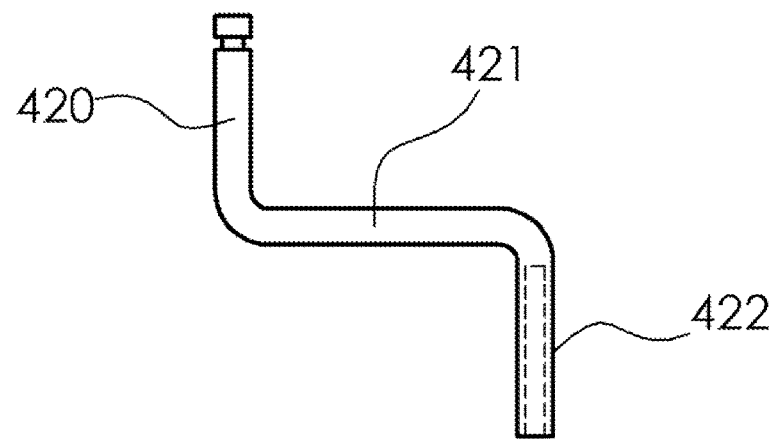
FIG. 21 is a front view of an arm in zigzag shape for a clip arrangement, in accordance with one embodiment.

FIG. 21 illustrates a front view 21-00 of an arm in zigzag shape for a clip arrangement, in accordance with one embodiment. As an option, the front view 21-00 may be implemented in the context of any one or more of the embodiments set forth in any previous and/or subsequent figure(s) and/or description thereof. Of course, however, the front view 21-00 may be implemented in the context of any desired environment. Further, the aforementioned definitions may equally apply to the description below.

As shown, an attachment section 420, a lever section 421, and a linking section 422 comprise an arm, where the attachment and the linking sections are on opposite side of the lever section.

In one embodiment, a zigzag-shaped clip arrangement may be advantageous for a device where other aspects of the device design suggest a position for at least one hinge bearing at a level that is different from that of the coupler part of the clip arrangement. For example, one or more of the electronic components may need to be placed in the device housing specifically for a higher design priority.

Figure 22A:
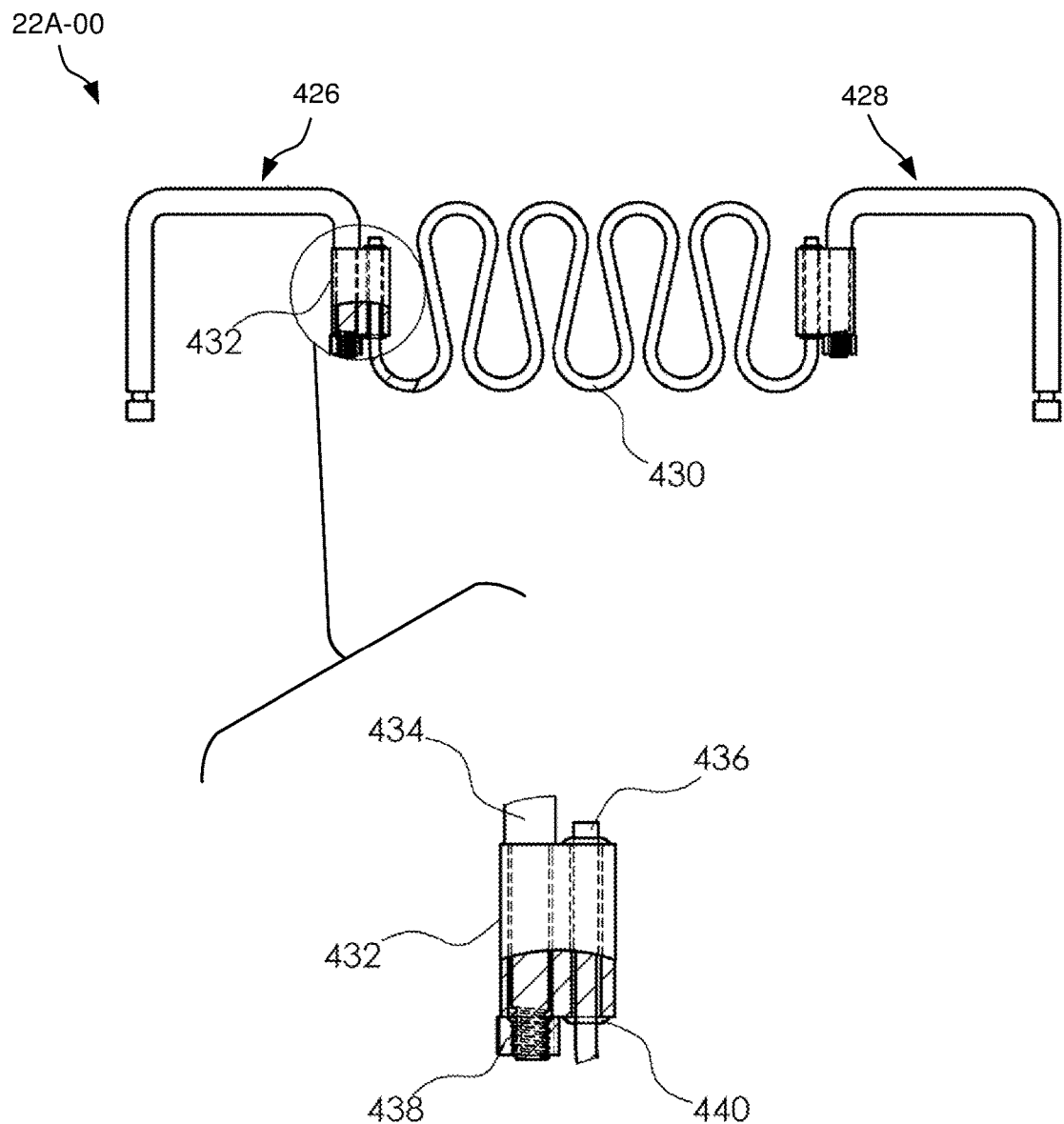
FIG. 22A is a front view of two sleeves each connecting an arm and the coupler spring of a clip arrangement, where the broken-out section shows an internal structure of the sleeve connection, in accordance with one embodiment.

FIG. 22A illustrates a front view 22A-00 of two sleeves each connecting an arm and the coupler spring of a clip arrangement, where the broken-out section shows an internal structure of the sleeve connection, in accordance with one embodiment. As an option, the front view 22A-00 may be implemented in the context of any one or more of the embodiments set forth in any previous and/or subsequent figure(s) and/or description thereof. Of course, however, the front view 22A-00 may be implemented in the context of any desired environment. Further, the aforementioned definitions may equally apply to the description below.

As shown, a clip arrangement comprises a first arm 426, a second arm 428, and a coupler spring 430. In addition, the clip arrangement uses a sleeve 432 to connect the coupler spring 430 and the first arm 426. Additionally, the linking section 434 of the first arm 426, which is threaded on its open end, goes through a hole of the sleeve 432 and is fastened with the sleeve using a threaded nut 438. In addition, the left side section 436 of the coupler spring 430 goes through another hole in the sleeve 432 and is bonded to the inner surface of the hole using glue 440. In this manner, the first arm 426 is connected to coupler spring 430, where the linking section 434 of the first arm 426 is hinged to the sleeve 432.

In one embodiment, the left side section 436 of the coupler spring and the sleeve 432 may also be connected in a hinge structure instead of bonding with glue. In another embodiment, the linking section 434 of the first arm 426 and the left side section 436 of the coupler spring 430 may be connected by welding or other conventional means, provided that the resulting joint may not yield to the stress or fail to the fatigue from the operation of the clip arrangement.

Figure 22B:
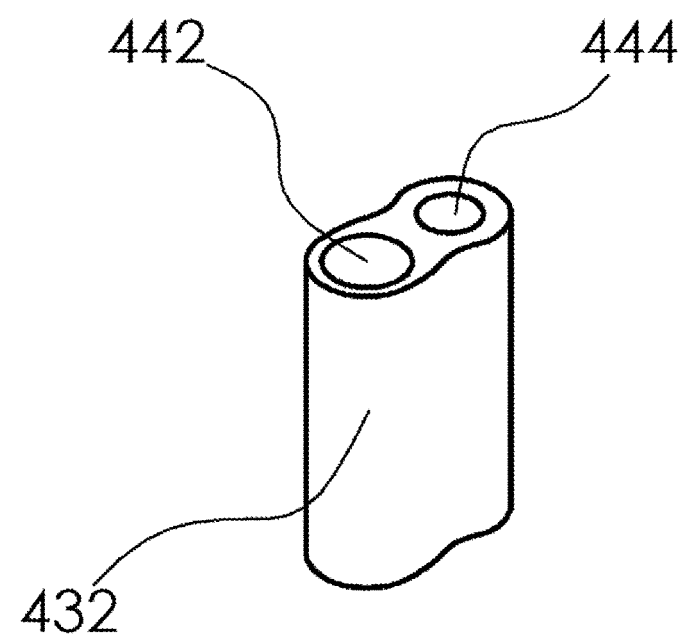
FIG. 22B is a perspective view of a sleeve in FIG. 22A, in accordance with one embodiment.

FIG. 22B illustrates a perspective view 22B-00 of a sleeve in FIG. 22A, in accordance with one embodiment. As an option, the perspective view 22B-00 may be implemented in the context of any one or more of the embodiments set forth in any previous and/or subsequent figure(s) and/or description thereof. Of course, however, the perspective view 22B-00 may be implemented in the context of any desired environment. Further, the aforementioned definitions may equally apply to the description below.

As shown, there are two holes 442 and 444 in the sleeve 432. Within the context of FIG. 22A and FIG. 22B, the linking section 434, which is threaded on its open end, may go through the hole 442 of the sleeve 432 and may be fastened in place a threaded nut 438. The left side section 436 of the coupler spring 430 may go through the hole 444, and may bond with the inner surface of the hole 444 using glue 440. As a result, the first arm 426 may be connected with coupler spring 430, where the linking section 434 of the first arm 426 may be hinged to the sleeve 432. Optionally, the linking section 434 and the hole 442 of the sleeve 432 may also be bonded using glue instead of a hinge structure. Optionally, the left side section 436 and the sleeve 432 may also be connected in a hinge structure instead of bonding with glue, similar to the connection between the linking section 434 and the sleeve 432. Furthermore, in another embodiment, the linking section 434 and the left side section 436 of the coupler spring 430 may be connected by welding and other conventional means, provided that the resulting joint may not yield to the stress or fail to the fatigue from the operation of the clip arrangement.

It should be noted that in any of the foregoing embodiments of the present description, the linking sections of the arms in the respective clip arrangement may be connected with the coupler part using any of the foregoing means described herein. Thus, their connections with the coupler part need not be the same. In fact, they may each use any other means appreciate to their actual materials and dimensions to connect with the coupler part.

Figure 23:
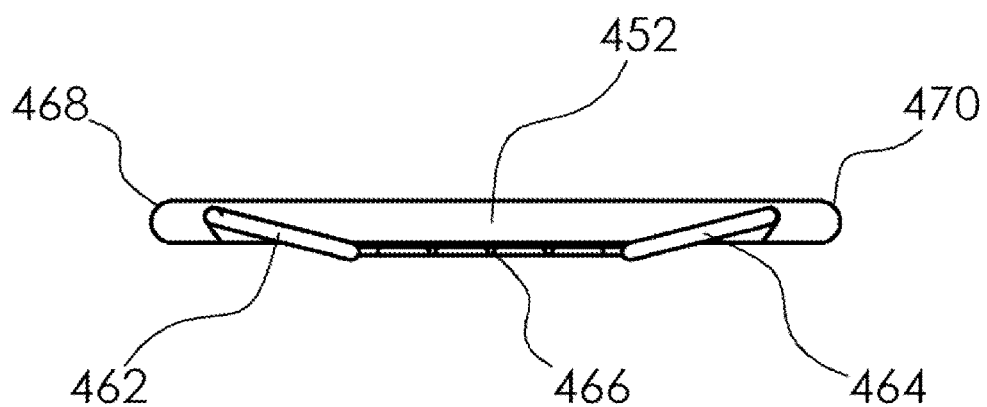
FIG. 23 is a top view of a standalone clip arrangement, in accordance with one embodiment.

FIG. 23 illustrates a top view 23-00 of a standalone clip arrangement, in accordance with one embodiment. As an option, the top view 23-00 may be implemented in the context of any one or more of the embodiments set forth in any previous and/or subsequent figure(s) and/or description thereof. Of course, however, the top view 23-00 may be implemented in the context of any desired environment. Further, the aforementioned definitions may equally apply to the description below.

As shown, a clip arrangement comprises a base 452, a first arm 462, a second arm 464, and a spring 466 coupling the first arm 462 and the second arm 464. In addition, the two sides 468 and 470 of the base are rounded so that they may pair up with a wearable device that is custom designed accordingly.

In one embodiment, mating may be configured with adequate retention and still be configured to be convenient to disengage. Other attachment mechanisms may also be used for a wearable device to be attached with the base 452. To withstand high stress during the operation of the clip arrangement, the base may incorporate a strong material such as a steel alloy. In use, a wearable device may be detached from the base 452 or from the user together with the clip arrangement. Moreover, multiple wearables may be attached to the user in turn by mating with clip arrangement, taking the many advantages of the clip arrangement of the present description even though they do not need to implement a full clip arrangement of the present description.

Further regarding clip arrangement, instead of using a removable attachment mechanism to attach to the device as above, the base 452 may incorporate any of the foregoing embodiments of the present description to that end. In this case, the base 452 comprises at least two clip arrangements of the present description. Herein, a further advantage of the clip arrangement is that it may be used to wear different electronic devices and may be particularly useful where the devices have different thickness or shapes.

It should also be noted that the foregoing embodiments of the present description can be applied beyond wearable electronic devices. For example, they may be used to wear jewelries or attach a medical article to a user's body for better wearing experiences and other foregoing benefits.

Optionally, in the foregoing embodiments of the present description, the housing may further comprise a means of removably attaching the electronic device. In that case, the housing may also be called a base of the respective clip arrangement to reflect its detachable feature from the device.

Figure 24A:
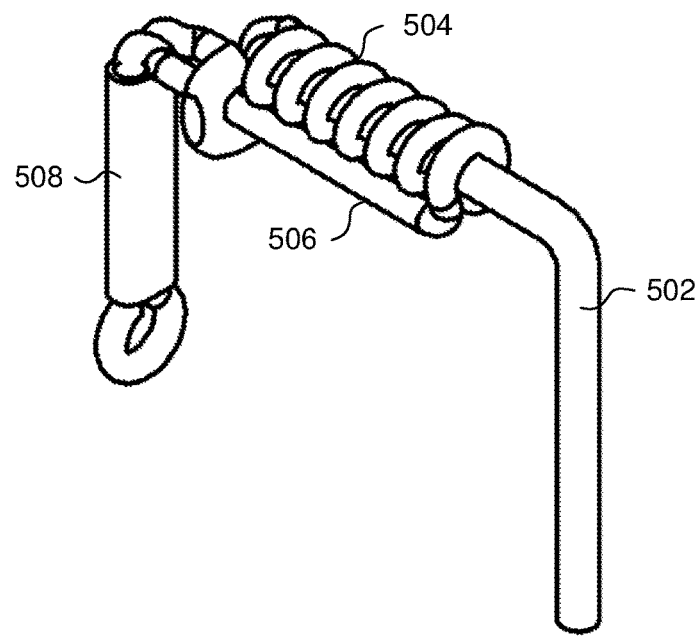
FIG. 24A is a perspective view of an arm of the clip arrangement with an expandable lever section, in accordance with one embodiment.

FIG. 24A illustrates a perspective view 24A-00 of an arm of the clip arrangement with an expandable lever section, in accordance with one embodiment. As an option, the perspective view 24A-00 may be implemented in the context of any one or more of the embodiments set forth in any previous and/or subsequent figure(s) and/or description thereof. Of course, however, the perspective view 24A-00 may be implemented in the context of any desired environment. Further, the aforementioned definitions may equally apply to the description below.

As shown, a linking section 502 and a lever section 506 comprise the expandable portion of an arm. In addition, a compression spring 504 is employed to provide force necessary to draw a clip arrangement closer to a wearable device. Additionally, retention sleeve 508 may slide into place over the two legs comprising the attachment section of lever section 506 to ensure that the two legs do not separate or otherwise compromise structural integrity of the arm.

In one embodiment, the compression spring 504 may continuously draw the linking section 502 toward the housing of the wearable device, thus allowing a clip arrangement to effectively grip onto an object (e.g. like the temple piece of a pair of eyeglasses, etc.). In a related embodiment, it is presumed that at least two expandable lever arms may be employed to adequately provide the force necessary to enable a gripping operation by an attached clip arrangement.

Figure 24B:
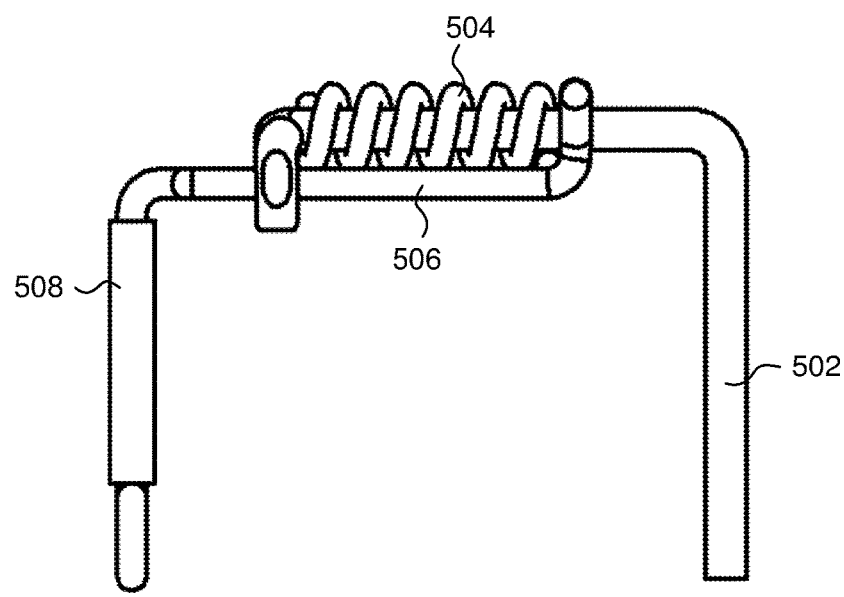
FIG. 24B is a front view of an arm of the clip arrangement with an expandable lever section, in accordance with one embodiment.

FIG. 24B illustrates a front view 24B-00 of an arm of the clip arrangement with an expandable lever section, in accordance with one embodiment. As an option, the front view 24B-00 may be implemented in the context of any one or more of the embodiments set forth in any previous and/or subsequent figure(s) and/or description thereof. Of course, however, the front view 24B-00 may be implemented in the context of any desired environment. Further, the aforementioned definitions may equally apply to the description below.

As shown, a linking section 502 and a lever section 506 comprise the expandable portion of an arm. In addition, a compression spring 504 is employed to provide force necessary to draw a clip arrangement closer to a wearable device. Additionally, retention sleeve 508 may ensure that the two legs comprising the attachment section of lever section 506 do not separate or otherwise compromise structural integrity of the arm.

Figure 24C:
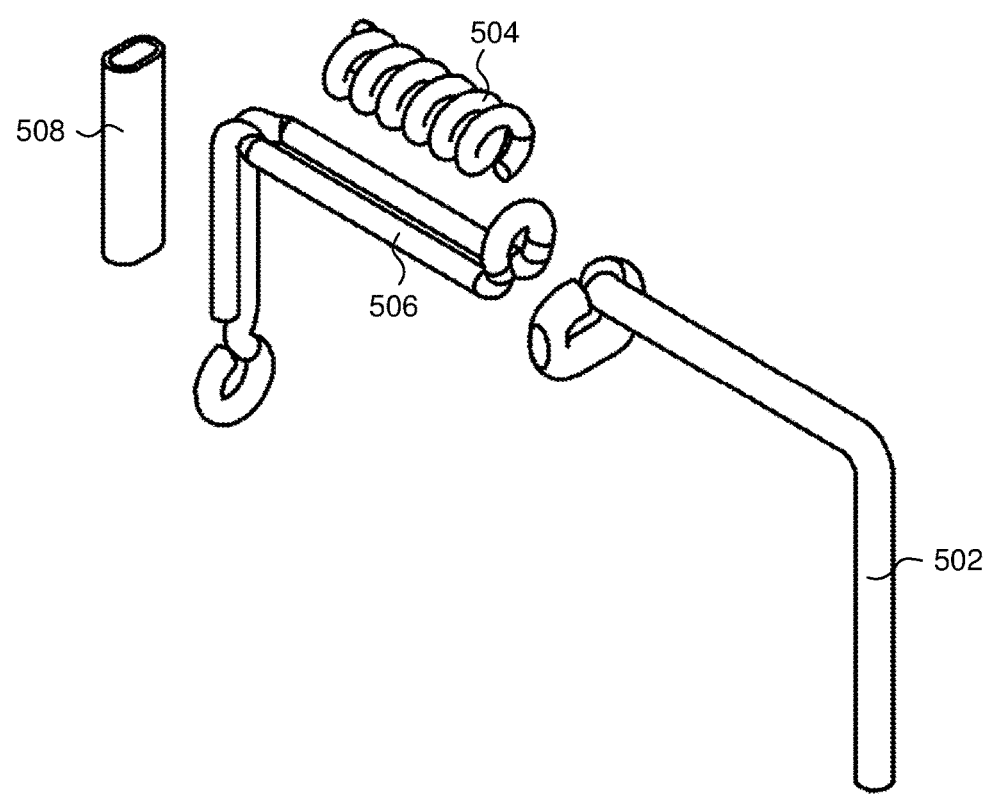
FIG. 24C is a perspective view of the component parts of an arm of the clip arrangement with an expandable lever section, in accordance with one embodiment.

FIG. 24C illustrates a perspective view 24C-00 of the component parts of an arm of the clip arrangement with an expandable lever section, in accordance with one embodiment. As an option, the perspective view 24C-00 may be implemented in the context of any one or more of the embodiments set forth in any previous and/or subsequent figure(s) and/or description thereof. Of course, however, the perspective view 24C-00 may be implemented in the context of any desired environment. Further, the aforementioned definitions may equally apply to the description below.

As shown, linking section 502 comprises an angled portion with an elongated loop on one end designed to wrap around and freely move back and forth over the two legs of lever section 506. In addition, compression spring 504 is designed to provide continuous opposing force to an "extended" lever section, translating into adequate force necessary to affect a gripping operation on the part of a connected clip arrangement. Additionally, lever section 506 comprises two separable legs, one of which terminates in a loop designed to attach the lever section 506 to the base of a wearable device. Further, retention sleeve 508 is designed to ensure that the two legs comprising the attachment section of lever section 506 do not separate or otherwise compromise structural integrity of the arm.

In one embodiment, a fully functioning arm with an expandable lever section may be assembled by passing the non-looped end of linking section 502 through compression spring 504 before then passing the two legs of lever section 506 through the elongated loop of linking section 502 and finally pulling retention sleeve 508 into place over the legs of lever section 506 to complete the assembly. In a related embodiment, it is presumed, then that at least one such arm with expandable lever section would be employed to adequately provide the force necessary to enable a gripping operation by an attached clip arrangement.

It will be understood that various features of the aspects of the apparatus and methods described herein may be used in combination with, or instead of, particular features of another aspect. Additionally, it should be appreciated that all embodiments in the present description are for illustration purposes. They are not intended to be exhaustive or to limit the embodiments to the precise forms disclosed. With the foregoing disclosure in detail, it will be apparent to one of ordinary skill in the art that the specific details are not required in order to practice the described embodiments and modifications and variations are possible without departing the scope of the present description defined in the appended claims.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A clip mechanism of a wearable device, the clip comprising:
   a first arm configured to attach to a housing of the wearable device at a first end of the first arm via a first hinge;
   a second arm configured to attach to the housing of the wearable device at a first end of the second arm via a second hinge; and
   a coupler to connect a second end of the first arm and a second end of the second arm, wherein:
   the coupler comprises an elastic member; and
   deformation of the elastic member cause the second ends of the first arm and the second arm to move relative to a side of the housing to adjust a distance between the coupler and the side of the housing.

2. The clip of claim 1, wherein each of the first arm and the second arm includes an attachment section at a first end, a linking section at a second end, and a lever section between the first end and the second end.

3. The clip of claim 2, wherein the first arm is configured such that when the first arm rotates around the first hinge, the linking section increases the distance from the side of the housing.

4. The clip of claim 2, wherein the second arm is configured such that when the second arm rotates around the second hinge, the linking section increases the distance from the side of the housing.

5. The clip of claim 1, wherein when the first arm rotates around the first hinge and when the second arm rotates around the second hinge, a gap between the coupler and the housing changes.

6. The clip of claim 5, wherein the gap is used to host an external object.

7. The clip of claim 1, wherein when the first arm rotates around the first hinge and when the second arm rotates around the second hinge, the elastic member changes in tension.

8. The clip of claim 7, wherein the rotation of the first arm around the first hinge and the rotation of the second arm around the second hinge occurs in opposite rotation directions.

9. The clip of claim 7, wherein expansion of the coupler creates a gap, wherein the gap is used to host an external object, and the external wearable device is held to the external object by a combination of at least one of: friction of the surface of the wearable device and of the surface of the external object, or the tension.

10. The clip of claim 1, wherein when the distance changes a gap is created between the coupler and the side of the housing, and an external object can be hosted within the gap such that the wearable device is affixed to the external object based on at least one of:
    friction of the surface of the external object,
    friction of the surface of the wearable device,
    a biasing force from the first arm and the second arm, or
    a tension of the elastic member.

11. The clip of claim 1, wherein the elastic member comprises at least one of:
    a serpentine spring, or
    a coil spring.

12. The clip of claim 11, wherein the serpentine spring is configured to provide low-profile such that, in the initial resting state, the serpentine spring is no more than 0.5 cm thick.

13. The clip of claim 11, wherein the serpentine spring is constructed of music wire.

14. The clip of claim 1, wherein at least one of the first arm or second arm is in the shape of at least one: U-shaped, zigzag, or curved.

15. The clip of claim 1, wherein the coupler includes a cover.

16. The clip of claim 1, further comprising a third arm configured to attach to the housing of the wearable device via a third hinge.

17. The clip of claim 16, wherein the third arm is configured to secure the coupler once the wearable device has been affixed to an external object.

18. The clip of claim 16, wherein the third arm is configured to work in tandem with the first arm and the second arm.

19. The clip of claim 1, further comprising a guide attached to the coupler, wherein the guide is configured to assist with affixing the wearable device to an external object.

20. The clip of claim 1, wherein the first hinge is configured such that the first arm can be detached from the housing, and the second hinge is configured such that the second arm can be detached from the housing.

21. A clip mechanism, the clip comprising:
a board;
a first arm configured to attach to a first hinge of the board at a first end of the first arm;
a second arm configured to attach to a second hinge of the board at a first end of the second arm; and
a coupler configured to connect a second end of the first arm to a second end of the second arm, comprising an elastic member, wherein deformation of the elastic member cause second ends of the first arm and the second arm to move relative to a side of the board to adjust a distance between the coupler and the side of the board.

22. The clip mechanism of claim 21, where the elastic member comprises a serpentine spring or a coil spring.

23. The clip of claim 1, wherein:
when the second end of the first arm or the second end of the second arm, and at least portion of the coupler adjacent to the second end of the arm, are spaced apart from the side of the housing, a gap is defined therebetween, the gap having an opening on the arm side, enabling an external object to be introduced into the gap and span both sides of the opening.

24. The clip of claim 23, wherein:
the gap opening on the first arm side and the gap opening on the second arm side are spaced apart in a direction substantially parallel to a longitude axis of the external object or to an edge of the external object over which the clip is attached.

25. The clip of claim 2, wherein:
each attachment section is rotatably attached to the housing via a respective hinge;
each linking section is attached to the coupler; and
each lever section extends between and spaces apart the attachment section and a corresponding linking section.

26. The clip of claim 24, wherein:
each attachment section rotates about an axis that is substantially perpendicular to a longitudinal axis of the housing.

27. The clip of claim 1, wherein:
the elastic member comprises an elastic band.

* * * * *